(12) United States Patent
Kuge

(10) Patent No.: US 7,555,367 B2
(45) Date of Patent: Jun. 30, 2009

(54) ADAPTIVE INTENTION ESTIMATION METHOD AND SYSTEM

(75) Inventor: Nobuyuki Kuge, Zushi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 335 days.

(21) Appl. No.: 11/142,479

(22) Filed: Jun. 2, 2005

(65) Prior Publication Data
US 2005/0273215 A1 Dec. 8, 2005

(30) Foreign Application Priority Data
Jun. 2, 2004 (JP) ............... P2004-164754

(51) Int. Cl.
*G01S 13/93* (2006.01)
(52) U.S. Cl. ............... 701/1; 340/436
(58) Field of Classification Search ............... 701/1, 701/96, 301; 340/436, 903, 435; 180/167, 180/169, 272; 342/70, 71; 382/106, 107
See application file for complete search history.

(56) References Cited

U.S. PATENT DOCUMENTS

| | | | |
|---|---|---|---|
| 5,485,892 A * | 1/1996 | Fujita | 180/167 |
| 6,053,270 A * | 4/2000 | Nishikawa et al. | 180/168 |
| 6,092,619 A * | 7/2000 | Nishikawa et al. | 180/446 |
| 6,134,491 A * | 10/2000 | Kawagoe et al. | 701/43 |
| 6,256,561 B1 * | 7/2001 | Asanuma | 701/41 |
| 6,393,361 B1 | 5/2002 | Yano et al. | |
| 6,889,161 B2 * | 5/2005 | Winner et al. | 702/147 |
| 7,038,577 B2 * | 5/2006 | Pawlicki et al. | 340/435 |
| 2003/0195684 A1 | 10/2003 | Martens | |

FOREIGN PATENT DOCUMENTS

| | | |
|---|---|---|
| DE | 101 32 386 A1 | 1/2003 |
| EP | 0 853 031 A2 | 7/1998 |
| EP | 0 899 174 | 3/1999 |
| JP | 11-99847 | 4/1999 |
| JP | 2002-331850 | 11/2002 |
| JP | 2003-246225 | 9/2003 |
| KR | 9709794 | 6/1997 |

OTHER PUBLICATIONS

U.S. Appl. No. 11/012,158, filed Dec. 16, 2004, Kuge et al.

* cited by examiner

*Primary Examiner*—Dalena Tran
(74) *Attorney, Agent, or Firm*—McDermott Will & Emery LLP

(57) ABSTRACT

Intention estimation methods and systems that are adaptive to changes in environment and/or operations are disclosed. An exemplary system includes a detector configured to detect at least one of a state of environment around a vehicle, and an operation performed by the driver of the vehicle. An intention estimation device is provided to generate an estimated intention of the driver based on the detected operation performed by the driver and an adjustable criterion.

17 Claims, 20 Drawing Sheets

FIG.14

| T: THRESHOLD VALUE | T>P | T=P | T<P |
|---|---|---|---|
| ESTIMATION TIMING OF LANE CHANGING | LOWER THAN T=P | | HIGHER THAN T=P |
| FREQUENCY IN ERROR ESTIMATION OF LANE CHANGING | SLOWER THAN T=P | | QUICKER THAN T=P |

ADAPTIVE INTENTION ESTIMATION METHOD AND SYSTEM

RELATED APPLICATION

The present application claims the benefit of priority from Japanese patent application No. 2004-164754, filed Jun. 2, 2004, the disclosure of which is incorporated herein by reference.

FIELD OF THE DISCLOSURE

The present disclosure relates to adaptive intention estimation methods and systems, and more specifically, to adaptive methods and systems for estimating a driver's intention based on changes of driving environment and/or operation status.

BACKGROUND OF THE DISCLOSURE

Driving assistance systems are used to assist drivers to operating vehicles. One type of driving assistance systems is capable of estimating a driver's intention, such that appropriate machine intervention is provided to either assist the intended operation or avoid operation risks associated with the intended operation. An example of conventional driving assistance systems with intention estimation calculates a likelihood value to a lane-keeping driving pattern to maintain the vehicle in the same lane, and a likelihood value of a lane-changing driving pattern to change lanes. The system selects one of the driving patterns with the highest likelihood value and assigns the selected driving pattern as the estimated intention of the driver.

However, these conventional systems are not adaptive to certain types of driving patterns and environments, such as an out-in-out operation on a curve or a road with bad surface conditions. Due to the unique lateral control of the vehicle involved in such driving patterns and environments, conventional systems tend to assume that the driver intends to change lanes, while the driver in fact intends to keep in the same lane for turning curves or cornering.

Therefore, there is a need for driving assistance methods and systems with adaptive intention estimation addressing dynamic changes in driving patterns and environments.

SUMMARY OF THE DISCLOSURE

Various embodiments of methods and systems with adaptive intention estimation are described. According to one embodiment, an exemplary system for estimating an intention of a driver of a vehicle includes a detector for detecting at least one of a state of environment around the vehicle, and an operation performed by the driver. An intention estimation device is provided to generate an estimated intention of the driver based on the detected operation performed by the driver and an adjustable criterion. The criterion may be selectively adjustable based on at least one of the state of environment and the operation status of the vehicle, or based on the location of the vehicle within the lane in which the vehicle is traveling. According to one embodiment, the criterion includes a comparison with a threshold selectively adjustable based on at least one of the state of environment and the operation status of the vehicle. In one aspect, the state of environment includes a curvature of a road in which the vehicle is traveling, and the criterion is adjusted based on the detected road curvature. In another aspect, the estimated intention is an intention to change lanes or an intention to keep in the same lane.

The estimated intention for the driver may be determined using various approaches. For instance, the estimated intention may be determined by generating data related to a plurality of hypothetical intentions of the driver to operate the vehicle, wherein each of the plurality of hypothetical intention is associated with a hypothetical operation of the vehicle. One of the plurality of hypothetical intentions is selected as the estimated intention of the driver, based on the detected operation performed by the driver, the hypothetical operation associated with each of the plurality of hypothetical intentions, and an adjustable criterion. In one aspect, a likelihood value associated with each of the plurality of hypothetical intentions of the driver is calculated based on the detected operation by the driver and the hypothetical operation associated with each of the plurality of hypothetical intentions. The exemplary system selects one of the plurality of hypothetical intentions as the estimated intention of the driver based on the respective likelihood value of each of the plurality of hypothetical intentions and the criterion.

The state of environment may include a driving status of a preceding vehicle in front of the vehicle, and the criterion is adjusted based on the operation status of the vehicle and the driving status of the preceding vehicle. The driving status of the machine may include at least one of a lateral speed of the vehicle, a lateral acceleration of the vehicle, and a yaw rate of the vehicle, and the criterion is adjusted based on at least one of the detected one of the lateral speed, the lateral acceleration and the yaw rate.

According to one embodiment, the system considers that the lane in which the vehicle is traveling is divided into a central region and two boundary regions, and the criterion is adjusted differently when the vehicle is in the central region and in one of the boundary regions. According to another embodiment, the exemplary system further includes a risk potential calculator configured to calculate a risk potential associated with the vehicle based on at least one of the operation status of the vehicle, the state of environment around the vehicle, and the operation performed by the vehicle. A control unit is provided to regulate a reaction force applied to a driver-controlled input device of the vehicle based on the calculated risk potential and the estimated intention of the driver, wherein the driver-controlled input device is provided for the driver to operate the vehicle, such as an accelerator pedal or a steering wheel.

The systems described herein may be implemented using software-implemented control procedure and/or one or more data processing devices such as controllers or central processing units. The systems and methods disclosed herein are applicable to assist operations of various types of machines such as a vehicle.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the figures of the accompanying drawing and in which like reference numerals refer to similar elements throughout.

FIG. 14 is a table illustrating lane changing estimations relative to different settings of a threshold value T.

DETAILED DESCRIPTION OF ILLUSTRATIVE EMBODIMENTS

In the following description, for the purposes of explanation, numerous specific details are set forth in order to provide a thorough understanding of the present disclosure. It will be apparent, however, to one skilled in the art that the present method and system may be practiced without these specific details. In other instances, well-known structures and devices are shown in block diagram form in order to avoid unnecessarily obscuring the present disclosure.

Figure 1:
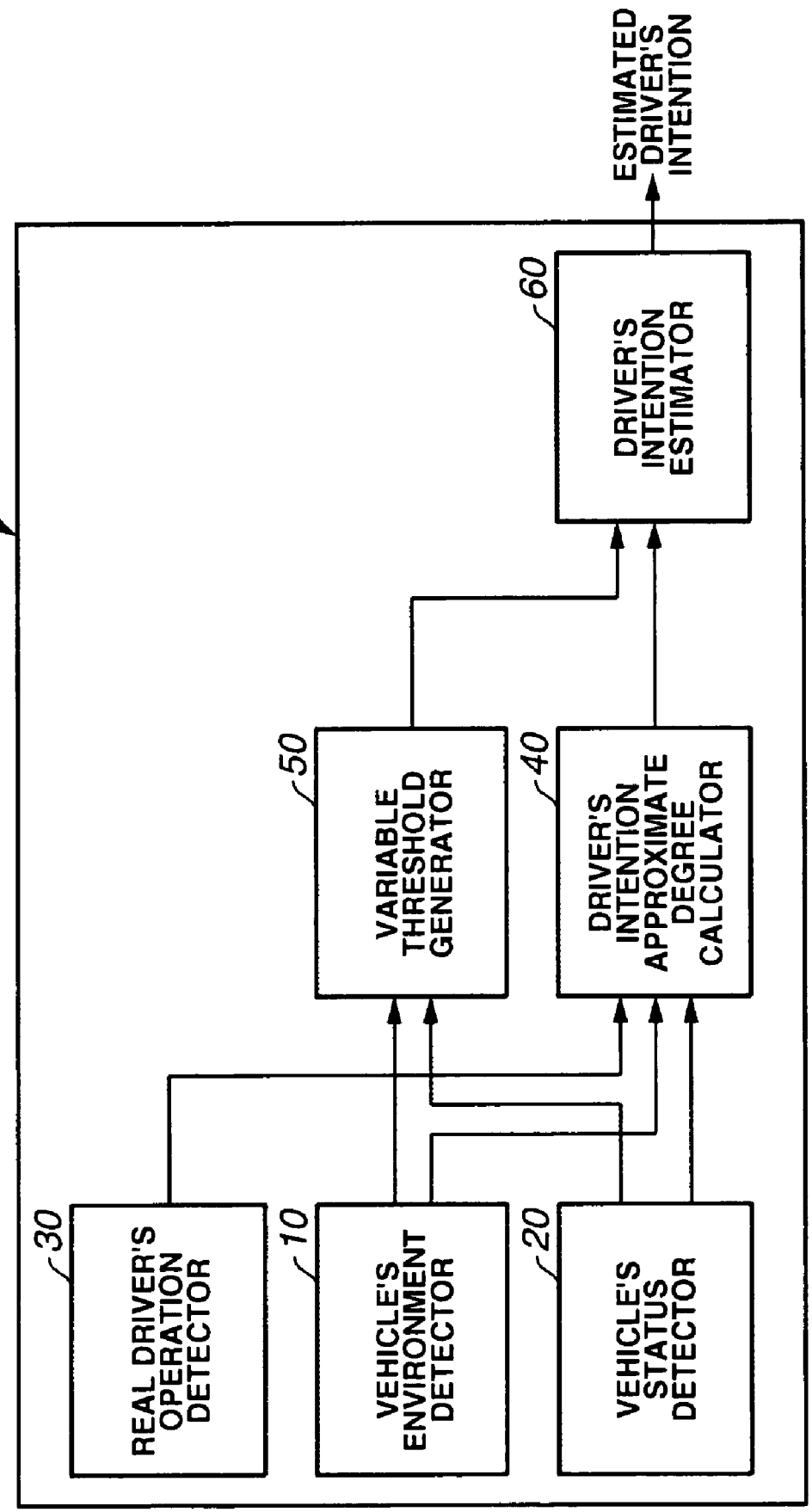
FIG. 1 is a block diagram illustrating an exemplary implementation of a driver's intention estimating system according to the present disclosure.

First Exemplary Implementation:

Referring to FIG. 1, an intention estimation system 1 includes a vehicle's environment detector 10, a vehicle's status detector 20, a real driver's operation detector 30, a driver's intention approximate degree calculator (or an imaginary driver's operation calculator) 40, a variable threshold generator 50, and a driver's intention estimator 60. The vehicle's environment detector 10 detects a state of environment within a field around the vehicle. The vehicle's status detector 20 detects status of the vehicle. The real driver's operation detector 30 detects an operation of a real driver in driving the vehicle.

System 1 has access to reference data, such as data related to a plurality of imaginary drivers. Each of the plurality of imaginary drivers has an associated intention and a corresponding operation to operate the vehicle according to the respective intention. System 1 evaluates how close the detected operation of the real driver to each of the plurality of imaginary drivers by comparing their respective operations, in order to generate an estimated intention, such as, an intention to keep in the lane or an intention to change lanes. Details for estimating a driver's intention are described in a co-pending U.S. patent application No. (application number not yet unassigned), entitled "METHOD AND SYSTEM FOR INTENTION ESTIMATION AND OPERATION ASSISTANCE," filed Dec. 16, 2003 and commonly assigned to the assignee of this application, the disclosure of which is incorporated herein by reference in its entirety.

In the exemplary implementation, the vehicle's environment detector 10 includes a front view camera that covers a field of front view and a yaw angle sensor. The front camera acquires image of road conditions within the field of front view. The vehicle's environment detector 10 detects an in-lane lateral distance y of the vehicle relative to a centerline within a lane, and a yaw angle $\psi$ of the vehicle with respect to a line parallel to the centerline. The vehicle's environment detector 10 is equipped with an image processor that processes the acquired image.

In the exemplary implementation, the vehicle's status detector 20 includes a vehicle speed sensor that detects a speed of the vehicle. The real driver's operation detector 30 includes a steering angle sensor that is provided in a steering system to detect a steering angle of the vehicle.

In the exemplary implementation, the driver's intention approximate degree calculator 40, variable threshold generator 50, and driver's intention estimator 60 are implemented using one or more microcomputers or microcontrollers executing microcode, software programs and/or instructions. The microcode and/or software reside in volatile and/or non-volatile data storage devices and/or machine-readable data storage medium such as read only memory (ROM) devices, random access memory (RAM) devices, SRAM, PROM, EPROM, CD-ROM, disks, carrier waves, etc.

The driver's intention approximate degree calculator 40 calculates operation of each imaginary driver in driving the vehicle according to an intention associated with each imaginary driver. The driver's intention approximate degree calculator 40 calculates a degree of similarity between the calculated operation of each imaginary driver and the detected operation of the real driver provided by the real driver's operation detector 30.

The variable threshold generator 50 alters a threshold value based on the vehicle status detected by the vehicle status detector 20 and the vehicle's environment detected by the vehicle's environment detector 10. The threshold value is used to estimate the driver's intention.

The driver's intention estimator 60 calculates a similarity index (such as a score) of the real driver's intention based on the degrees of similarity between each calculated operation of the imaginary driver and the detected operation of the real driver. The driver's estimator 60 estimates the driver's intention by comparing the calculated similarity index to the threshold value.

Figure 2:
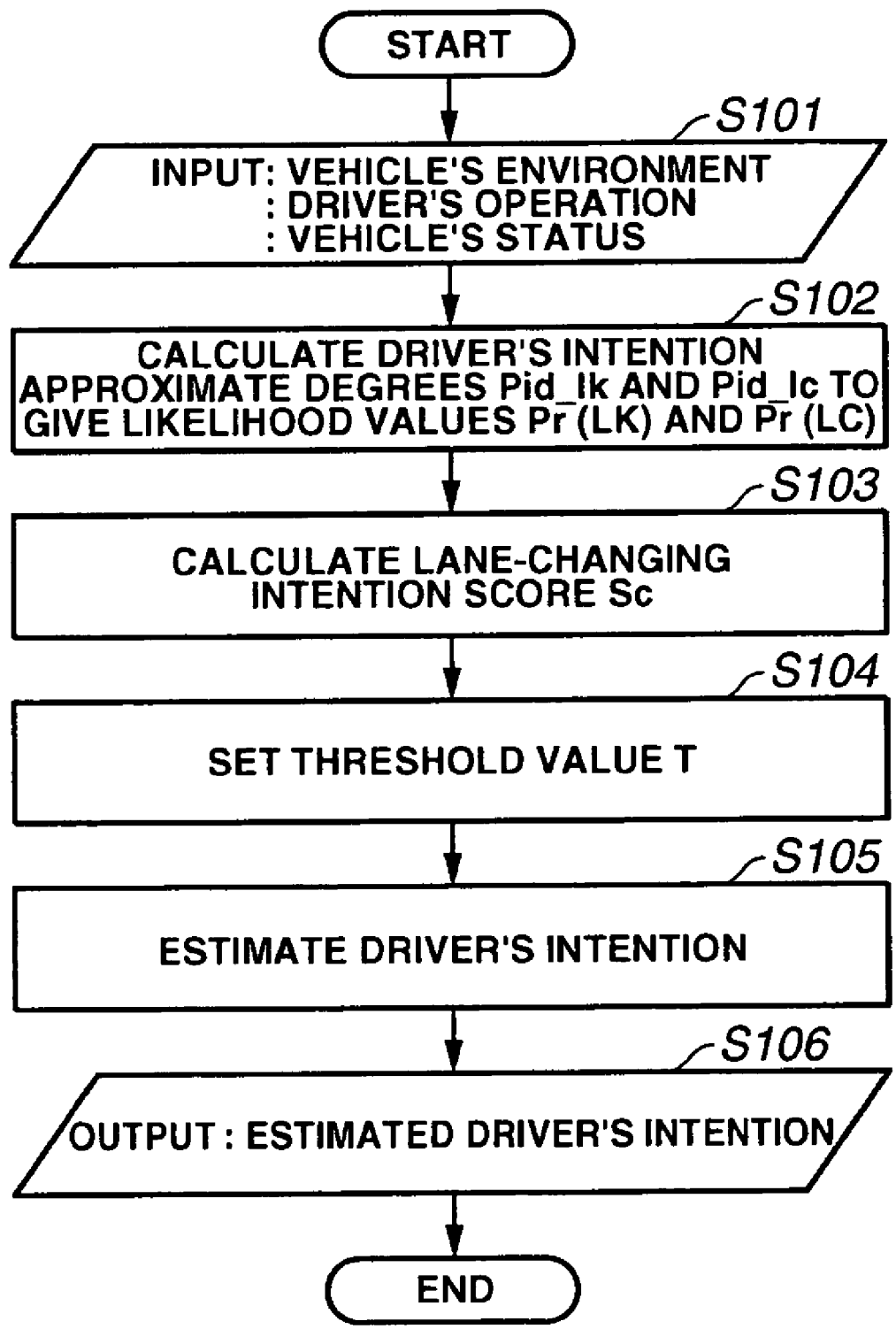
FIG. 2 is a flow chart illustrating the operation of the driver's intention estimating system illustrated in FIG. 1.
Figure 3:
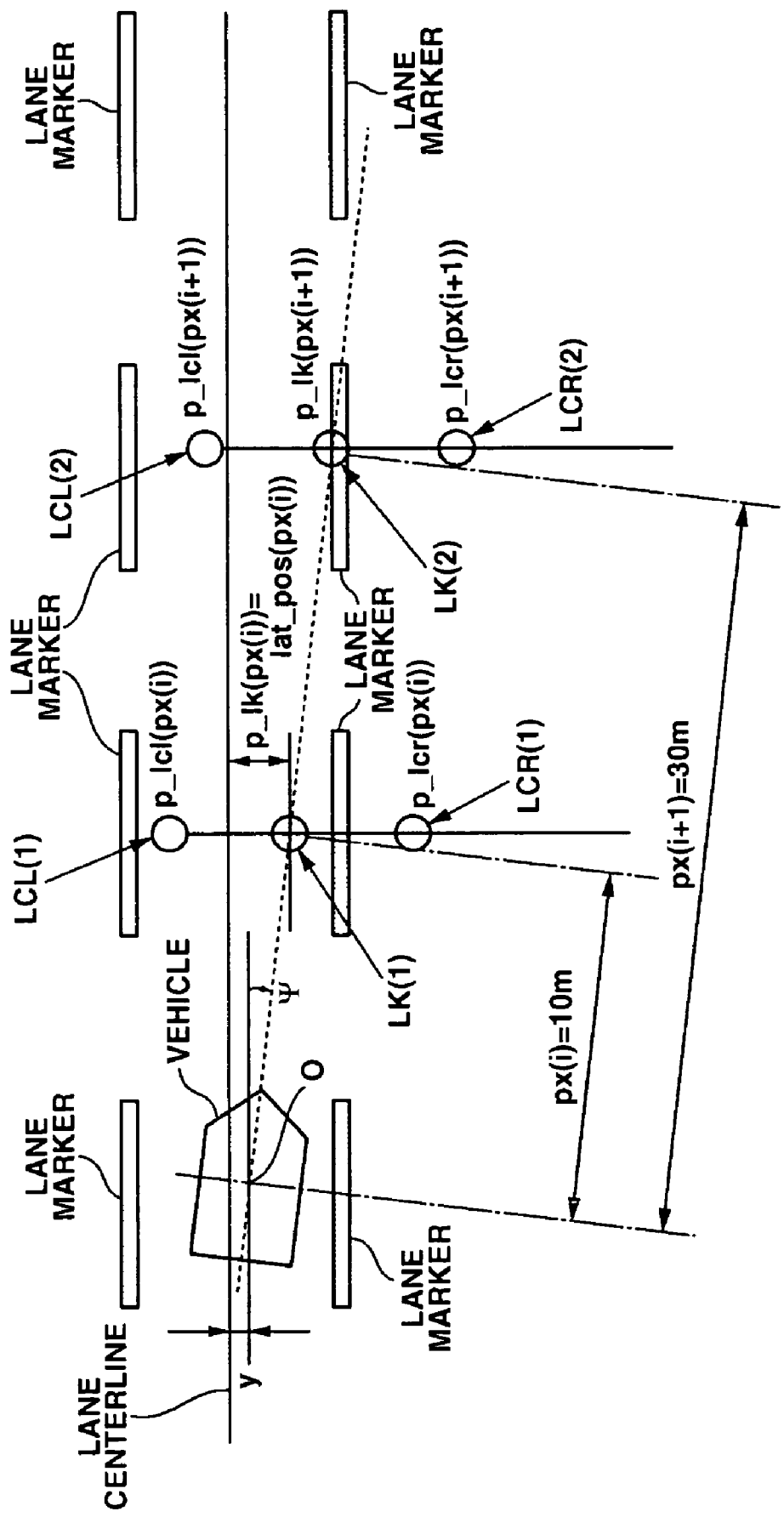
FIG. 3 illustrates an example to calculate operation of each imaginary driver in driving the vehicle as directed by a given intention.

Referring to FIGS. 2 and 3, the operation of the driver's intention estimating system 1 is explained. The flow chart in FIG. 2 illustrates a driver's intention estimation processing program. Execution of this program is repeated at a regular interval of, for example, 50 milliseconds.

At step S101, the microcomputer reads data related to the vehicle's environment, vehicle's status and driver's operation, which are detected by the vehicle's environment detector 10, vehicle's status detector 20 and real driver's operation detector 30, respectively. The microcomputer reads in an in-lane lateral position y of the vehicle within a lane (or track), a yaw angle ψ of the vehicle, and a steering angle θid. As shown in FIG. 3, the in-lane lateral position y is a distance between the center O of the vehicle and the centerline of the lane. The yaw angle ψ is an angle through which the vehicle is turned relative to the centerline of the lane.

At step S102, the microcomputer calculates a degree of similarity Pid_lk between operation of an imaginary driver having a lane-keeping intention and the detected operation of the real driver, and a degree of similarity Pid_lc between an operation of an imaginary driver having a lane changing intention and the detected operation of the real driver, to generate likelihood values Pr(LK) and Pr(LC), respectively. The microcomputer calculates operation Oid of each of a plurality of imaginary drivers. In this example, three imaginary drivers are utilized, including an imaginary driver A having a lane-keeping intention (LK), an imaginary driver B having a lane-changing intention to the right (LCR), and an imaginary driver C having a lane-changing intention to the left (LCL). The microcomputer calculates operation Oid of each of these three imaginary drivers A, B and C in driving the vehicle according to the given intention. More particularly, the microcomputer calculates a steering angle θid, by which each of the three imaginary drivers A, B and C manipulates a steering wheel in driving the vehicle as directed by the given intention. The following descriptions discuss the calculation of Oid.

(1) Imaginary Driver A having a Lane-Keeping Intention (LK):

To calculate a steering angle θid_lk, by which the imaginary driver A manipulates a steering wheel in driving the vehicle as directed by the lane-keeping intention (LK), the microcomputer sets at least one reference point LK(i) in front on a longitudinal centerline of the vehicle at a distance px(i) from the center O of the vehicle, and calculates a lateral position p_lk(px(i)) of the reference point LK(i) from a centerline of a lane. At least one reference point LK(i) includes any desired number of reference points LK(i). In this example, as shown in FIG. 3, two reference points LK(1) and LK(2) are set on the longitudinal centerline of the vehicle at different distances px(1) and px(2) from the center O of the vehicle. The setting was made that the distance px(1)=10 m and the distance px(2)=30 m. The distance px(i) may have varying values with different vehicle speeds.

A lateral distance lat_pos(px(i)) of the reference point LK(i) from the centerline of the lane is dependent on, and thus determined by, the yaw angle ψ and the distance px(i), which may be, for example, given by processing the acquired image from the front camera. Thus, the lateral position p_lk(px(i)) of the reference point LK(i) may be expressed as:

$$p\_lk(px(i))=lat\_pos(px(i))\ i=\{1,\ldots,n\} \quad (\text{Eq. 1})$$

The number n is equal to 2 (n=2) in the example shown in FIG. 3.

Using the lateral position p_lk(px(i)), the steering angle θid_lk may be expressed as:

$$\theta id\_lk = \Sigma\{a(i) \cdot p_{13}lk(px(i))\} \quad (\text{Eq. 2})$$

where: a(i) is an appropriately determined coefficient weighting the lateral position p_lk(px(i)) and is determined based on characteristics of vehicles, such as the gear ratio of a vehicle implementing the system disclosed herein.

(2) Imaginary Driver B having a Lane-Changing Intention to the Right (LCR):

To calculate a steering angle θid_lcr, by which the imaginary driver B manipulates a steering wheel in driving the vehicle as directed by the lane-changing intention to the right (LCR), the microcomputer sets at least one reference point LCR(i). At least one reference point LCR(i) includes any desired number of reference points LCR(i). In this example, as shown in FIG. 3, two reference points LCR(1) and LCR(2) are set.

A lateral position p_lcr(px(i)) of the reference point LCR(i) may be given as a sum of lat_pos(px(i)) and a predetermined offset lc_offset_lcr, and thus expressed as:

$$p\_lcr(px(i))=lat\_pos(px(i))+lc\_\text{offset}\_lcr\ i=\{1,\ldots,n\} \quad (\text{Eq. 3})$$

The number n is equal to 2 (n=2) in the example shown in FIG. 3. The predetermined offset lc_offset_lcr is an appropriately determined value for giving the lateral position p_lcr(px(i)) of the reference point LCR(i). In this example, the offset lc_offset_lcr is equal to −1.75 (lc_offset_lcr=−1.75).

Using the lateral position p_lcr(px(i)), the steering angle θid_lcr may be expressed as:

$$\theta id\_lcr = \Sigma\{a(i) \cdot p\_lcr(px(i))\} \quad (\text{Eq. 4})$$

where: a(i) is an appropriately determined coefficient weighting the lateral position p_lcr(px(i)) and is determined based on characteristics of vehicles, such as the gear ratio of a vehicle implementing the system disclosed herein.

(3) Imaginary Driver C Having a Lane-Changing Intention to the Left (LCL):

To calculate a steering angle θid_lcl, by which the imaginary driver C manipulates a steering wheel in driving the vehicle as directed by the lane-change intention to the left (LCR), the microcomputer sets at least one reference point LCL(i). At least one reference point LCL(i) includes any desired number of reference points LCL(i). In this example, as shown in FIG. 3, two reference points LCL(1) and LCL(2) are set.

A lateral position p_lcl(px(i)) of the reference point LCL(i) may be given by a sum of lat_pos(px(i)) and a predetermined offset lc_offset_lcl, and thus expressed as:

$$p\_lcl(px(i)) = lat\_pos(px(i)) + lc\_offset\_lcl \; i = \{1, \ldots, n\} \quad \text{(Eq. 5)}$$

The number n is equal to 2 (n=2) in the example shown in FIG. 3. The predetermined offset lc_offset_lcl is an appropriately determined value for giving the lateral position p_lcl(px(i)) of the reference point LCL(i). In this example, the offset lc_offset_lcl is equal to 1.75 (lc_offset_lcr=1.75).

Using the lateral position p_lcl(px(i)), the steering angle θid_lcl may be expressed as:

$$\theta id\_lcl = \Sigma\{a(i) \cdot p\_lcl(px(i))\} \quad \text{(Eq. 6)}$$

where: a(i) is an appropriately determined coefficient weighting the lateral position p_lcl(px(i)) and is determined based on characteristics of vehicles, such as the gear ratio of a vehicle implementing the system disclosed herein.

The calculated operation Oid of each of the imaginary drivers A, B and C is compared to the operation Ord of the real driver detected by the real driver operation detector 30. In this exemplary implementation, the operation Ord of the real driver is a steering angle θrd manipulated by the real driver.

Using the calculated operation Oid of each imaginary driver and the detected operation Ord of the real driver, the microcomputer calculates a degree of similarity Pid based on the calculated operation Oid of each imaginary driver and the detected operation Ord of the real driver. The degree of similarity Pid is used to represent any one of a degree of similarity Pid_lk of the imaginary driver A, a degree of similarity Pi_lcr of the imaginary driver B, and an degree of similarity Pid_lcl of the imaginary driver C. In the exemplary implementation, the calculated operation Oid of each imaginary driver is expressed by any one of the calculated steering angles θid_lk, θid_lcr, and θid_lcl. An imaginary driver's steering angle θid is used to mean any one of these calculated steering angles θid_lk, θid_lcr, and θid_lcl. In the exemplary implementation, the detected operation Ord of the real driver is expressed by the detected real driver's steering angle θrd.

The degree of similarity Pid of each imaginary driver may be calculated using a logarithmic probability of a normalized value of the imaginary driver's steering angle θid relative to a normal distribution, where the mean (e) is the real driver's steering angle θrd and the variance (σ) is a predetermined value ρrd such as a standard deviation of steering angles.

The degree of similarity Pid may be expressed as:

$$Pid = \log\{Probn[(\theta id - \theta rd)/\rho rd]\} \quad \text{(Eq. 7)}$$

where Probn is a probability density function that is used to calculate a probability with which a given sample is observed from a population expressed by the normal distribution.

Using the equation (Eq. 7), the microcomputer calculates a degree of similarity Pid_lk of lane-keeping (LK), a degree of similarity Pid_lcr of lane-changing to the right (LCR), and a degree of similarity Pid_lcl of lane-changing to the left (LCL). The larger one of the degree of similarities Pid_lcr and Pid_lcl defines a degree of similarity Pid_lc of lane-changing, which may be expressed as:

$$Pid\_lc = \max\{Pid\_lcr, Pid\_lcl\} \quad \text{(Eq. 8)}$$

The degree of similarity Pid_lk of lane-keeping indicates a likelihood value Pr(LK) of a lane-keeping intention possessed by the real driver. The degree of similarity Pid_lc of lane-changing indicates a likelihood value Pr(LC) of a lane-changing intention possessed by the real driver. After giving the likelihood values Pr(LK) and Pr(LC) of the real driver, the program proceeds to step S103.

At step S103, using the lane-keeping likelihood value Pr(LK) and lane-changing likelihood value Pr(LC), the microcomputer calculates a score Sc of lane-changing intention. The lane-changing intention score Sc may be expressed as:

$$Sc = \frac{\log Pr(LK)}{\log Pr(LC) + \log Pr(LK)} \quad \text{(Eq. 9)}$$

The score Sc given by the equation Eq. 9 has a value between 0 and 1. The score Sc increases if the certainty (probability) on lane-changing intention is high relative to the certainty on lane-keeping intention. For example, if the certainty of the lane-changing intention relative to the certainty of the lane-keeping intention is 50:50, the score Sc is 0.5 (Sc=0.5). If the certainty on the lane-changing intention is 100%, the score Sc is 1 (Sc=1).

At step S104, the microcomputer sets the threshold value T based on at least one of the vehicle's environment, driver's operation and vehicle's status that are detected at step S101. The threshold value T is a value of score Sc. If the calculated score Sc exceeds threshold value T (Sc>T), then the driver's intention may be estimated as a lane-changing intention. Otherwise, the driver's intention is estimated as a lane-keeping intention.

Varying the threshold value T in an increasing direction lowers the frequency of correctly estimating a lane-changing intention if it is possessed by the driver, while the increased threshold value T lowers the frequency of error in estimating the lane-changing intention if in fact a lane-keeping intention is possessed by the driver. Varying the threshold value T in a decreasing direction increases the frequency of error in estimating the lane-changing intention if in fact a lane-keeping intention is possessed by the driver, while the decreased threshold value T increases the frequency of correctly estimating the lane-keeping intention if such intention is possessed by the driver.

Accordingly, the threshold value T is determined by accounting for a balance between the frequency of making an error in estimating a lane-changing intention during a lane-keeping operation and the frequency of correctly estimating the lane-changing intention if such intention is possessed by the driver. Generally speaking, the threshold value T is set at 0.5 (T=0.5). If the threshold value 0.5 is unaltered in response to a change in environment around and status of a vehicle, it is likely to make an error in estimating a lane-changing intention when the driver intends to perform an out-in-out operation in passing through a curved road and/or upon lateral movement to cope with surface conditions of a straight road. Thus, an adaptive change in the threshold value T with different running states of the vehicle reduces the frequency of making an error in estimating a lane-changing intention.

Figure 4:
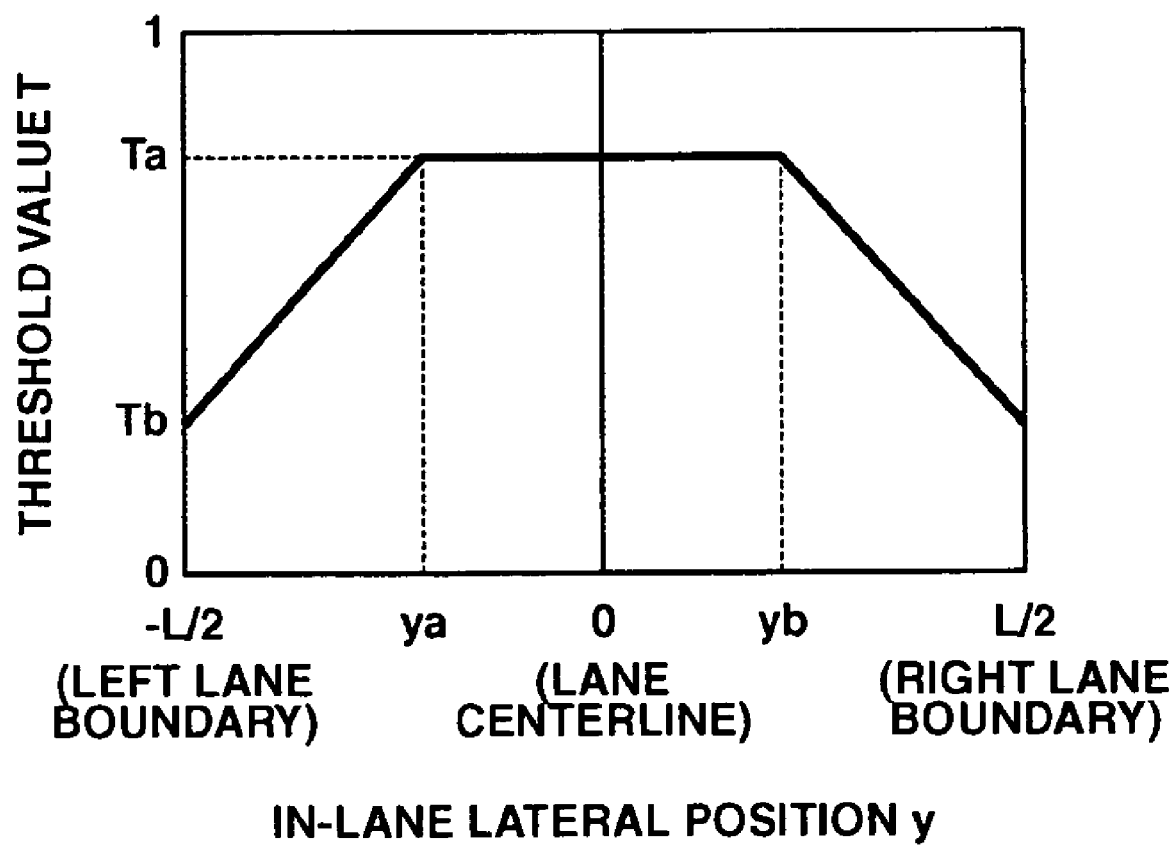
FIG. 4 is a graphical representation of varying of a threshold value T with different lateral positions within a lane.

In one embodiment, the threshold value T is varied based on an in-lane lateral position y of the vehicle relative to the centerline within a lane. FIG. 4 illustrates the relationship between the in-lane lateral position y and the threshold value T. In FIG. 4, if a lane has a width L, the in-lane lateral position y is equal to zero (y=0) when the center O of the vehicle is on the centerline within the lane. The in-lane lateral position y is equal to L/2 (y=L/2) when the center O of the vehicle is on the lane boundary on the right, and it is equal to −L/2 (y=−L/2) when the center O of the vehicle is on the lane boundary on the left.

The lane has a lane central region defined relative to the centerline. The lane central region extends in opposite directions from the centerline to a position y=yb and to a position y=ya (ya is a negative value), where yb is equal to the absolute value of ya.

Referring to FIG. 4, the threshold value T is set equal to a value Ta (Ta>0.5, for example) when the vehicle is running within the lane central region (ya≦y≦yb). When the center O of the vehicle enters one of two lane boundary regions after leaving the lane central region, the threshold value T gradually decreases from value Ta to a value Tb based on different values of the in-lane lateral position y as the vehicle approaches the adjacent lane boundary. In this example, the threshold value T falls between 0 and 1 (0<T<1). The lane central region is a region in which the vehicle is considered to be less likely to change lanes, so that the threshold value T is increased to the value Ta that is sufficiently large for careful estimation of a lane-changing intention. Each of the two lane boundary regions is a region in which the vehicle is more likely to change lanes. Accordingly, the threshold value T is decreased from value Ta for an aggressive estimation of a lane-changing intention.

Referring to FIG. 2, after setting the threshold value T at step S104, the program proceeds to step S105. At step S105, the microcomputer estimates an intention possessed by a real driver. Specifically, the microcomputer compares the score Sc calculated at step S103 to the threshold value T set at step S104, and estimates that the driver's intention is a lane-changing intention when the score Sc exceeds threshold value T (Sc>T). When the score Sc does not exceed threshold value T (Sc≦T), the microcomputer estimates that the driver's intention is a lane-keeping intention.

If the vehicle is traveling near the centerline within a lane, the frequency of making an error in estimating a lane-changing intention against a lane-keeping intention by the real driver is lowered because the threshold value T is set at a large value Ta. If the vehicle is traveling within one of the two lane boundary regions, it is highly sensitive in estimating a lane-changing intention because the threshold value T is set at the value smaller than the value Ta.

At step S106, the microcomputer provides the result from estimation made at step S105 as an intention of the real driver.

From the preceding description, the first exemplary implementation provides effects as follows:

(1) Based on the status of a vehicle, the state of environment around the vehicle and the operation by a real driver, the intention estimation system 1 calculates likelihood values for a plurality of intentions, which the real driver may possess. In other words, a plurality of imaginary drivers having different intentions is set. From a degree of similarity between operation Oid of each of the imaginary drivers and operation Ord of the real driver, the driver's intention estimating system 1 calculates likelihood values of driver's intentions, that is, a lane-changing intention likelihood value Pr(LC) and a lane-keeping intention likelihood value Pr(LK). Then, based on the calculated likelihood values and a driver's intention estimating standard, the driver's intention estimating system 1 estimates a driver's intention of the real driver. The variable threshold generator 50 alters the driver's intention estimating standard based on at least one of the status of the vehicle and the state of environment around the vehicle. Altering the driver's intention estimating standard reduces the frequency of an error estimation of a driver's intention, which tends to occur under certain traveling conditions, and allows positive estimation of the driver's intention.

(2) The variable driver's intention estimating standard setting section 50 alters the driver's intention estimating standard in an increasing direction to enhance the accuracy in estimating the driver's intention of the driver. Altering the driver's intention estimating standard lowers the error estimation that tends to occur under certain traveling conditions.

(3) The variable driver's intention estimating standard setting section (50) alters the driver's intention estimating standard in a decreasing direction to enhance the response speed in estimating the driver's intention. Altering the driver's intension estimating standard allows fast estimation of the driver's intention based on the status of the vehicle and the environment around the vehicle.

(4) The variable driver's intention estimating standard setting section (50) sets a lane-changing intention estimating threshold value (T) as the driver's intention estimating standard. The driver's intention likelihood calculator (40) calculates a lane-changing intention likelihood value Pr(LC) for a lane-changing intention, and a lane-keeping intention likelihood value Pr(LK) for a lane-keeping intention. The driver's intention estimator (60) compares a lane-changing intention score Sc that is calculated based on the lane-changing intention likelihood value Pr(LC), and the lane-keeping intention likelihood value Pr(LK) to the threshold value (T), and estimates a lane-changing intention as the driver's intention when the lane-changing intention score exceeds the driver's intention estimating standard (T). As a result, the driver's intention is estimated in good accuracy.

(5) The variable driver's intention estimating standard setting section (50) alters the driver's intention estimating standard (T) based on an in-lane lateral position y of the vehicle. Altering the driver's intention estimating standard based on the in-lane lateral position y lowers the possibility of an error estimation that tends to occur during lateral control of the vehicle within the lane.

(6) The driver's intention estimating standard setting section (50) sets a central region within a lane and two lane boundary regions. As shown in FIG. 4, the lane-changing intention estimating threshold value T is greater when the in-lane lateral position y falls in the lane central region (ya≦y≦yb) than when the in-lane lateral position y falls in one (y<ya, or y>yb) of the two lane boundary regions. Altering the lane-changing intention estimating threshold value T in a manner described above reduces a probability of an error estimation of a lane-changing intention even if the in-lane lateral position y varies during lateral control of the vehicle within the lane. It is considered that a lane-changing operation is more probable during traveling on one of the two lane boundary regions than during traveling on the lane central region. Thus, setting the threshold value T to a small value (<Ta) during traveling on one of the two lane boundary regions allows for a positive estimation of a lane-changing intention.

Second Exemplary Implementation:

The second exemplary implementation of a driver's intention estimating system is now described. The hardware of second exemplary implementation is the same as the first exemplary implementation. However, the second exemplary implementation differs from the first exemplary implementation in the following respects.

According to the second exemplary implementation, a curvature ρ of a road on which a vehicle is traveling is used in combination with an in-lane lateral position y to determine a threshold value T. A driver may perform an out-in-out line operation in passing a curved road or making a curved turn. It is less frequent that a driver may change lanes when passing the curved road. Taking these driving conditions into account, as the road curve becomes tight when the road curvature ρ increases, increasing the threshold value T reduces the frequency of making an error estimation of a lane-changing intention while the driver actually possesses a lane-keeping.

The road curvature ρ is given by calculating a road curvature at a current location or a location spaced a distance in front of the vehicle based on road information obtained by a navigation system, information obtained from a road-vehicle communication, and a status of the vehicle.

Figure 5:
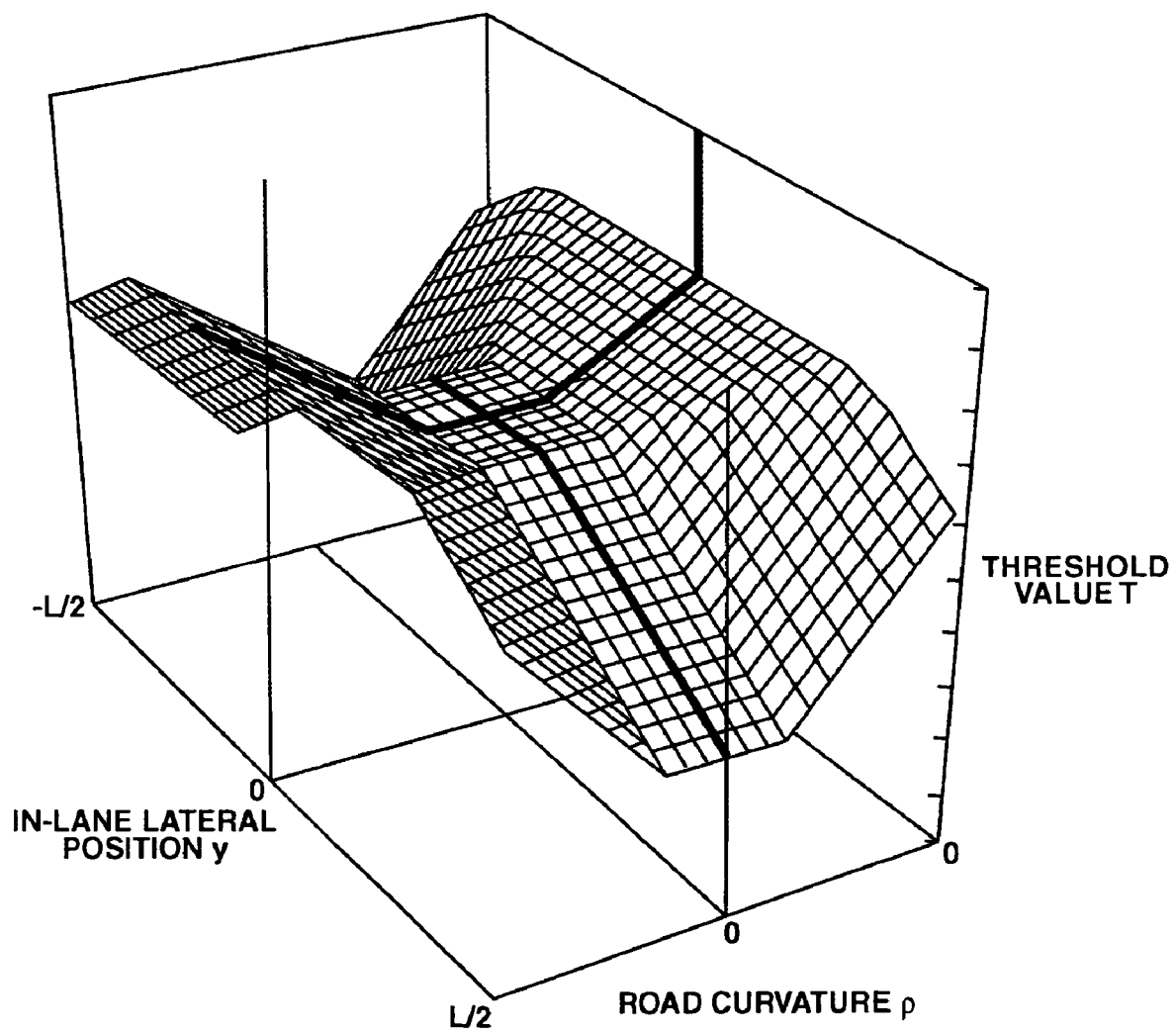
FIG. 5 is a three-dimensional map illustrating values of threshold value T relative to different lateral positions within a lane and different curvatures of a road.

In FIG. 5, the relationship between the in-lane lateral position y, road curvature ρp, and threshold value T is illustrated in a three-dimensional map. The road curvature ρ and threshold value T have a relationship that the threshold value T has the minimum value responsive to the road curvature ρ being 0 (zero) and the vehicle traveling on a straight road. As the road curves becomes tight and the road curvature ρ grows, the threshold value T grows. The relationship between the road curvature ρ and threshold value T is common for passing through a curved road to the right or to the left. The in-lane lateral position y and threshold value T have the same relationship as that employed by the above-mentioned first exemplary implementation. The threshold value T increases as the in-lane lateral position of the vehicle approaches the lane centerline, while the threshold value T decreases as the in-lane lateral position of the vehicle approaches one of the lane boundaries.

Using the threshold value T, which has been determined based on the in-lane lateral position y and road curvature ρ, makes it possible to lower the frequency of making an error estimation of a lane-changing intention upon approaching a lane boundary during performing an out-in-out operation or upon performing a lateral control in passing a curved road. This provides an enhanced the accuracy in estimating the driver's intention. According to an embodiment of this disclosure, the road curvature ρ alone may be used to determine the threshold value T without the need of the in-lane lateral position y.

In addition to the effects provided by the first exemplary implementation, the second exemplary implementation provides effects as follows:

(1) The variable driver's intention estimating standard setting section (50) alters a driver's intention estimating threshold value (T) based on a road curvature ρ. Altering the threshold value T in this manner lowers the possibility of an error estimation of a lane-changing intention accounting for line taking or lateral control within a lane when driving the vehicle through a curved road.

(2) As shown in FIG. 5, the variable driver's intention estimating standard setting section (50) increases the lane-changing intention estimating threshold value (T) when the road curvature p is large. Altering the threshold value (T) in this manner lowers the possibility of an error estimation of a lane-changing intention accounting for line taking or lateral control within a lane during driving the vehicle through a curved road.

Using the threshold value T, which has been set by referring to the three-dimensional map shown in FIG. 5 based on the road curvature ρ and in-lane lateral position y, ensures that the estimated driver's intention is adaptive to real running conditions. Specifically, responsive to an out-in-out operation in passing a curved road, a lateral range in which the in-lane lateral position y is compared to the increased threshold value T is increased, as the curve becomes tight and road curvature ρ grows.

Third Exemplary Implementation

The third exemplary implementation of a driver's intention estimating system is now described. The hardware of the third exemplary implementation is the same as the first exemplary implementation. However, the third exemplary implementation is different from the first exemplary implementation in the following respects.

According to the third exemplary implementation, a degree of approach to a preceding vehicle is used to correct a threshold value T that has been determined by an in-lane lateral position y. The degree of approach corrects the threshold value T such that the threshold value T is small as the host vehicle approaches the preceding vehicle because it is likely that the host vehicle may pass the preceding vehicle.

Figure 6:
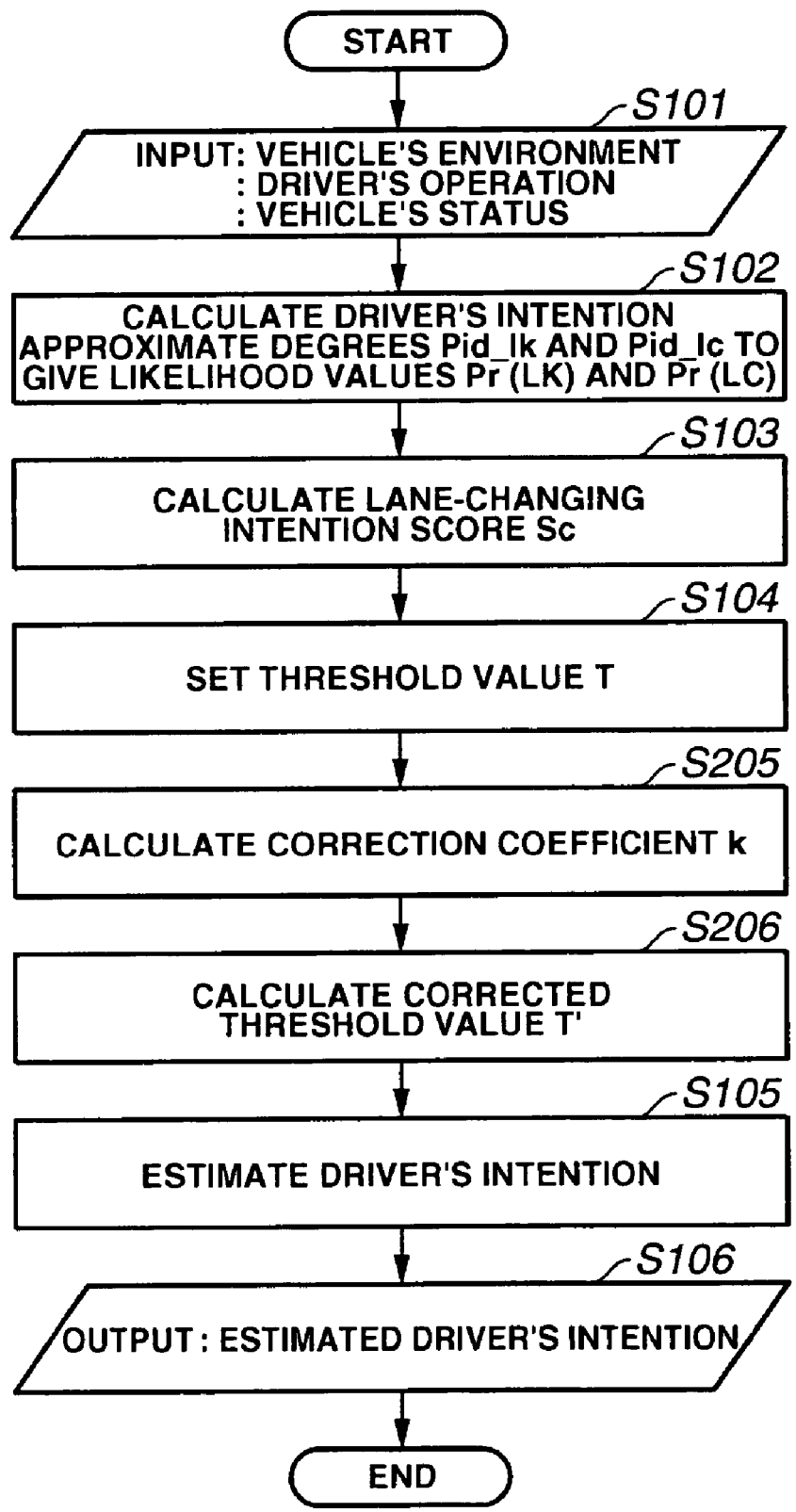
FIG. 6 is a flow chart illustrating the operation of another exemplary implementation of a driver's intention estimating system according to the present disclosure.

The flow chart of FIG. 6 illustrates an operation of the third exemplary implementation of driver's intention estimating system 1. Execution of this program is repeated at a regular interval of, for example, 50 milliseconds. The flow chart of FIG. 6 is substantially the same as the flow chart of FIG. 2 except for two additional steps S205 and S206 between the steps S104 and S105. Like reference numerals are used to designate like steps throughout FIGS. 2 and 6. For simplicity of illustration, descriptions on the steps S101, 102, S103, S104, S105, and S106 is hereby omitted.

In FIG. 6, at step S205, a correction coefficient k is calculated based to a degree of approach to a preceding vehicle. The degree of approach may be given by the reciprocal of a distance to the preceding vehicle in front the host vehicle or the reciprocal of a time threshold THW or the reciprocal of a time to collision TTC. The time threshold THW is given by dividing a distance to the preceding vehicle by a vehicle speed of the host or the preceding vehicle. The time to collision TTC is given by dividing a distance to the preceding vehicle by a relative vehicle speed between the host vehicle and the preceding vehicle.

Figure 7:
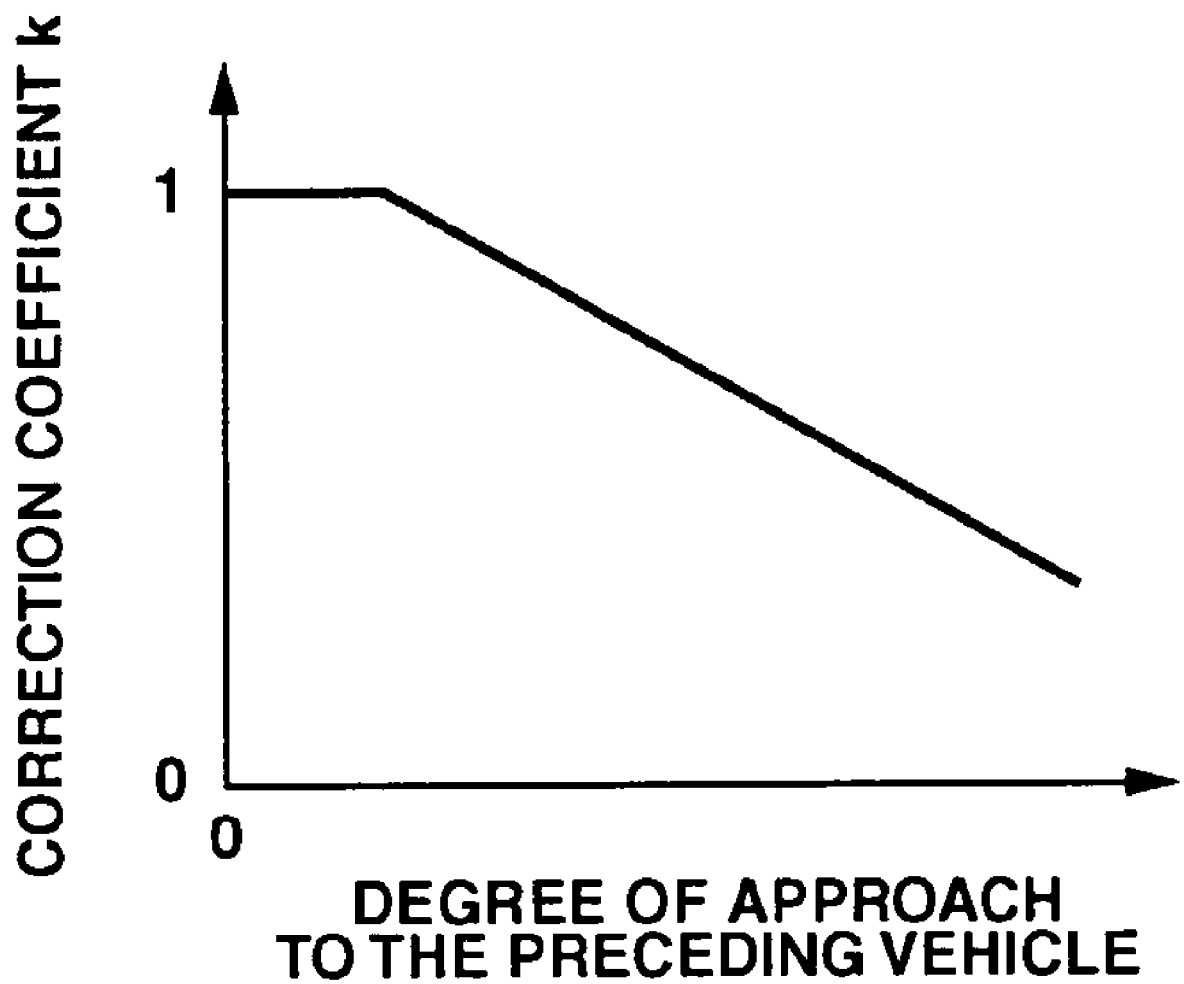
FIG. 7 is a graphical representation illustrating values of a correction coefficient for a threshold value T relative to different distances between a host vehicle and the preceding vehicle.

FIG. 7 illustrates values of the correction coefficient k relative to different degrees of approach to the preceding vehicle. As shown in FIG. 7, the setting is such that the correction coefficient k approaches 1 (one) as the degree of approach becomes small. The correction coefficient k becomes smaller than 1 as the degree of approach becomes large or as the reciprocal of a distance to the preceding vehicle becomes large.

At the next step S206, the threshold value T obtained at step S104 is corrected by the correction coefficient k obtained at step S205. The corrected threshold value denoted by T' may be expressed as:

$$T'=k \cdot T \tag{Eq. 10}$$

At step S105, a real driver's intention is estimated after comparing the score Sc calculated at step S103 to the corrected threshold value T' calculated at step S206. The driver's intention is estimated as a lane-changing intention when the score Sc is greater than the corrected threshold value T' (Sc>T'). When the score Sc is not greater than the corrected threshold value T' (Sc≦T'), the driver's intention is estimated as a lane-keeping intention. If the host vehicle approaches the preceding vehicle, the corrected threshold value T' becomes small, enhancing sensitivity in estimating a lane-changing intention upon approaching the preceding vehicle.

At step S106, the result from estimation made at step S105 is provided as an intention of the real driver.

In addition to the effects provided by the first exemplary implementation, the third exemplary implementation provides effects as follows:

(1) The variable driver's intention estimating standard setting section (50) alters the lane-changing intention estimating threshold value (T) based on a degree of approach to the preceding vehicle in front of the host vehicle. Altering the threshold value (T) in this manner increases the speed (sensitivity) with which the lane-changing intention is estimated, allowing fast estimation of the lane-changing intention.

(2) The variable driver's intention estimating standard setting section (50) alters the lane-changing intention estimating threshold value (T) such that threshold value T corresponding to a large degree of approach to the detected preceding vehicle is smaller than the threshold value T corresponding to a small degree of approach to the detected preceding vehicle. In one embodiment, the threshold value (T) set in response to the in-lane lateral position y is corrected by multiplying the threshold value (T) with a correction coefficient k that becomes small as the degree of approach to the preceding vehicle becomes large as shown in FIG. 7. If the degree of approach to the preceding vehicle is large, there is an increased possibility that the host vehicle may pass the preceding vehicle by changing lanes. Under this condition, setting the threshold value (T) to a small value allows a faster calculation of lane-changing intention.

In the third exemplary implementation, a degree of approach to the preceding vehicle is used to correct the threshold value T that has been set in response to the in-lane lateral position. However, the present disclosure is not limited to this example. It is possible to calculate a threshold value T directly from a degree of approach to the preceding vehicle alone, without relying on the in-lane lateral position y.

Fourth Exemplary Implementation

The fourth exemplary implementation of a driver's intention estimating system is now described. The hardware of the fourth exemplary implementation is the same as the first exemplary implementation. However, the fourth exemplary implementation is different from the first exemplary implementation in the following respects.

According to the fourth exemplary implementation, a lateral speed $\dot{y}$ of a host vehicle is used to set a threshold value T that has been determined by an in-lane lateral position y. Specifically, the lateral speed $\dot{y}$ is used to switch the manner of setting the threshold value T.

Figure 8:
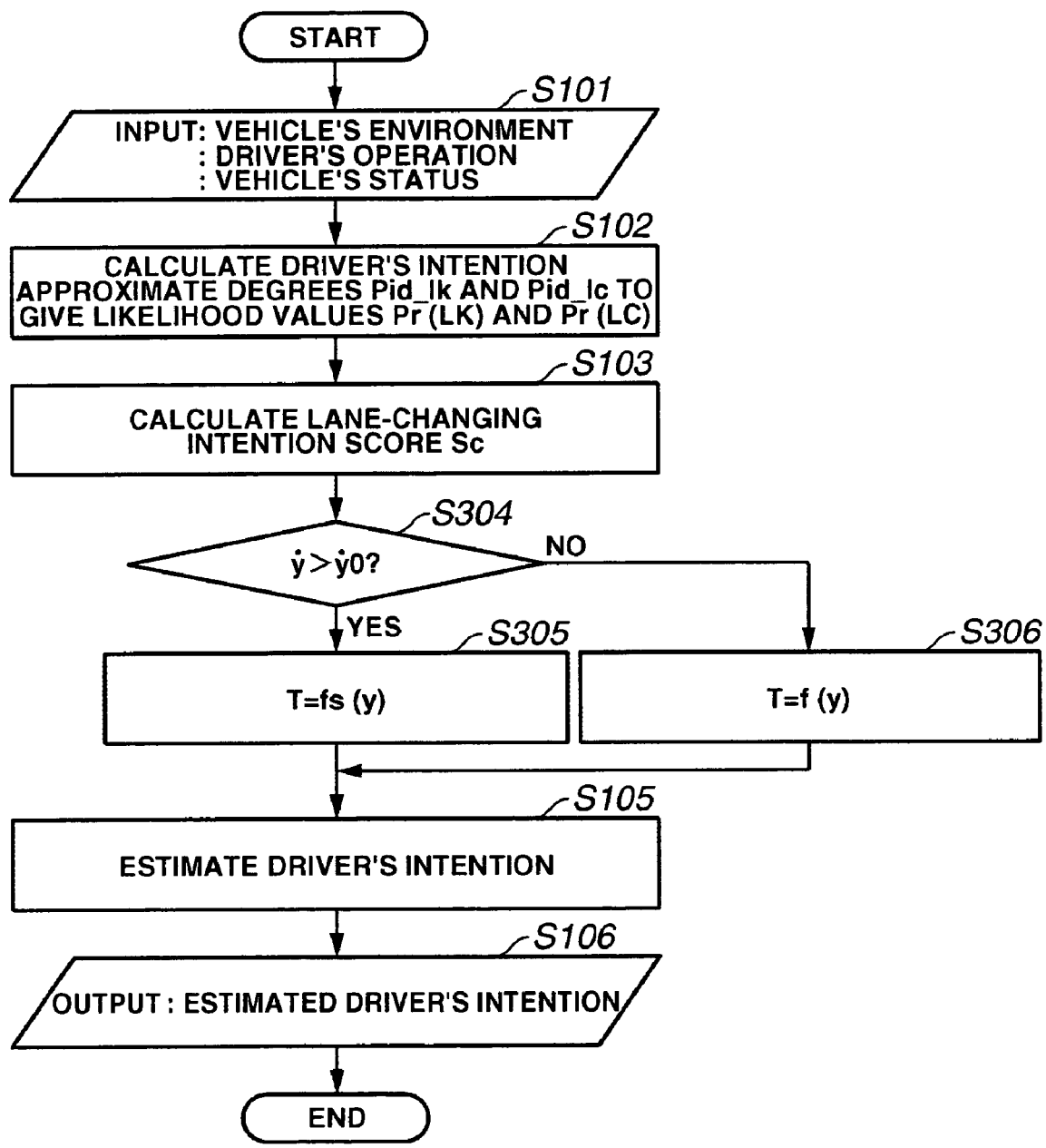
FIG. 8 is a flow chart illustrating the operation of another exemplary implementation of a driver's intention estimating system according to the present disclosure.

The flow chart of FIG. 8 illustrates operation of the fourth exemplary implementation of driver's intention estimating system 1. This flow chart illustrates steps of jobs of a driver's intention estimating program. Execution of this program is repeated at a regular interval of, for example, 50 milliseconds. The flow chart of FIG. 8 is substantially the same as the flow chart of FIG. 2 except for additional steps S304, S305 and S306 between steps S103 and S105. Like reference numerals are used to designate like steps throughout FIGS. 2 and 8. For simplicity of illustration, descriptions related to the steps S101, 102, S103, S105, and S106 are omitted.

At step S304, a lateral speed $\dot{y}$ of the host vehicle is compared to a predetermined value $\dot{y}0$. The lateral speed $\dot{y}$ is a derivative of lane lateral position y with respect to time. If the lateral speed $\dot{y}$ is greater than the predetermined value $\dot{y}0$ ($\dot{y} > \dot{y}0$), the program proceeds to step S305. If the lateral speed $\dot{y}$ is less than or equal to the predetermined value $\dot{y}0$ ($\dot{y} \leq \dot{y}0$), the program proceeds to step S306.

At step S306, the in-lane lateral position y determines the threshold value T as required when the lateral speed $\dot{y}$ is low ($\dot{y} \leq \dot{y}0$). In this example, similarly to the setting as shown in FIG. 4 employed by the first exemplary implementation, the threshold value T is set at a relatively large value when the vehicle is running within a lane central region. The threshold value T becomes smaller as the vehicle approaches the adjacent lane boundaries. This setting of the threshold value T is illustrated by the broken line in FIG. 9. The threshold value T illustrated by the broken line in FIG. 9 may be expressed as T=f(y).

At step S305, the threshold value T as required when the lateral speed $\dot{y}$ is high ($\dot{y} > \dot{y}0$) is computed. In general, it is highly probable that a lane-changing intention appears when the lateral speed $\dot{y}$ is greater than the predetermined value. Thus, as shown by the fully drawn line in FIG. 9, the threshold value T=fs(y) corresponding to a lateral speed $\dot{y}$ exceeding predetermined value $\dot{y}0$ is set lower than the threshold value T=f(y) corresponding to a lateral speed $\dot{y}$ less than or equal to the predetermined value $\dot{y}0$. If the lateral speed $\dot{y}$ exceeds the predetermined value $\dot{y}0$, the threshold value T becomes small, which enhances the sensitivity in estimating a lane-changing intention.

At step S105, a real driver's intention is estimated after comparing the score Sc calculated at step S103 to the threshold value T calculated at step S305 or S306. The driver's intention is estimated as a lane-changing intention when the score Sc exceeds the threshold value T (Sc>T). When the score Sc does not exceed the threshold value T (Sc≤T), the driver's intention is estimated as a lane-keeping intention. At step S106, the result from estimation made at step S105 is provided as an intention of the real driver.

In the fourth exemplary implementation, the lateral speed $\dot{y}$ is used in adjusting the threshold value T. According to another embodiment, instead of the lateral speed $\dot{y}$, a lateral acceleration or a yaw rate of the vehicle may be used in switching setting of the threshold value T.

In addition to the effects provided by the first exemplary implementation, the fourth exemplary implementation provides effects as follows:

(1) The variable driver's intention estimating standard setting section (50) alters the lane-changing intention estimating threshold value (T) based on the lateral speed or the lateral acceleration or the yaw rate. Altering the lane-changing intention estimating threshold value (T) when a lane changing is imminent increases the speed (sensitivity) with which the lane-changing intention is estimated, thus allowing a faster estimation of the lane-changing intention.

Figure 9:
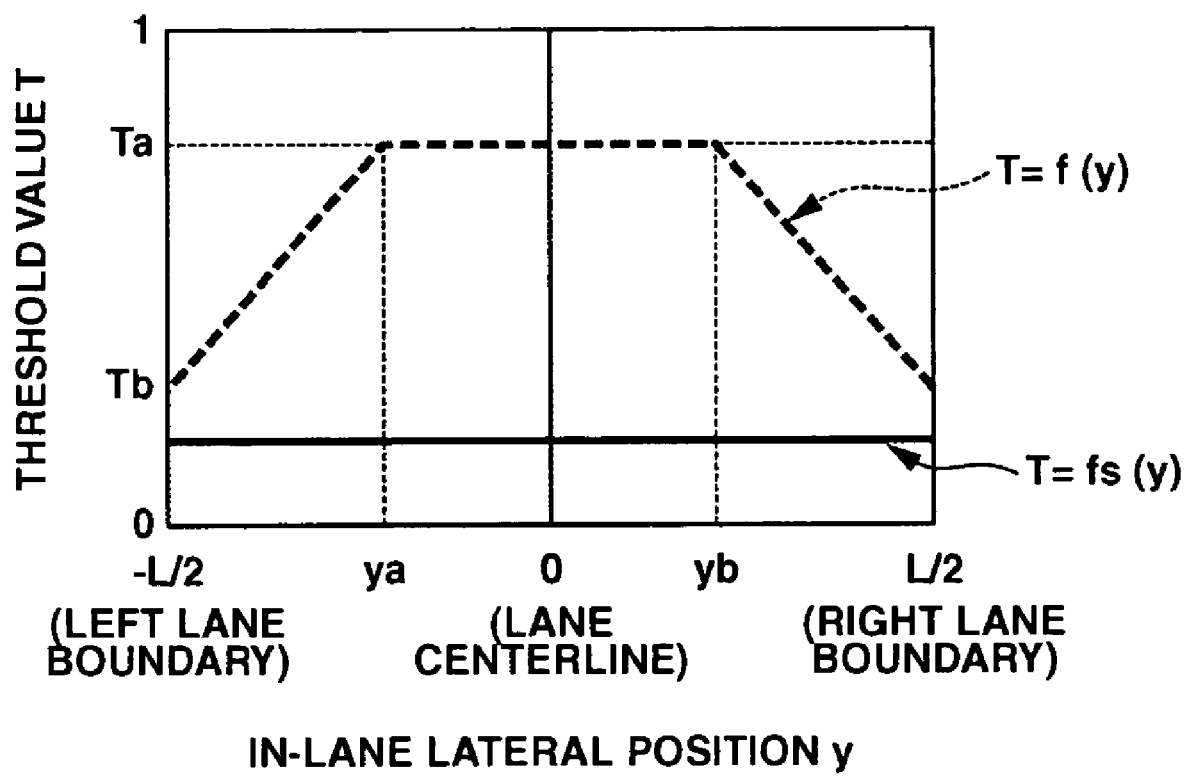
FIG. 9 is a graphical representation illustrating a threshold value T changing relative to different lateral positions within a lane.

(2) The variable driver's intention estimating standard setting section (50) alters the lane-changing intention threshold value (T) such that threshold value T is small when the lateral speed or lateral acceleration or yaw rate is large. For example, as shown in FIG. 9, a smaller threshold value T=fs (y) is set rather when the lateral speed $\dot{y}$ is greater than the predetermined value $\dot{y}0$. In this manner, the lane-changing intention estimating threshold value T is set small when the lateral speed $\dot{y}$ is great and the lane-changing is imminent, to allow a positive estimation of the lane-changing intention by increasing the speed (sensitivity) in estimating the lane-changing intention.

In the fourth exemplary implementation, the threshold value T is kept constant when the lateral speed $\dot{y}$ exceeds the predetermined value $\dot{y}0$. However, the present disclosure is not limited to this example. It is possible that the threshold value T increases when the vehicle is disposed within a central region within a lane.

Fifth Exemplary Implementation

The fifth exemplary implementation of a driver's intention estimating system is now described. The hardware of the fifth exemplary implementation is the same as the first exemplary implementation. However, the fifth exemplary implementation is different from the first exemplary implementation in the following respects.

In the first exemplary, using the lane-keeping likelihood value Pr(LK) and lane-changing likelihood value Pr(LC), the score Sc of lane-changing intention is calculated, and compared to the threshold value T.

In the fifth exemplary implementation, instead of the calculation of the score Sc, a difference between the lane-changing likelihood value Pr(LC) and the lane-keeping likelihood value Pr(LK) is calculated. The difference Pr(LC)–Pr(LK) is compared to a threshold value Ts. The threshold value Ts is set based on a status of a host vehicle and running environment around the vehicle.

Figure 10A:
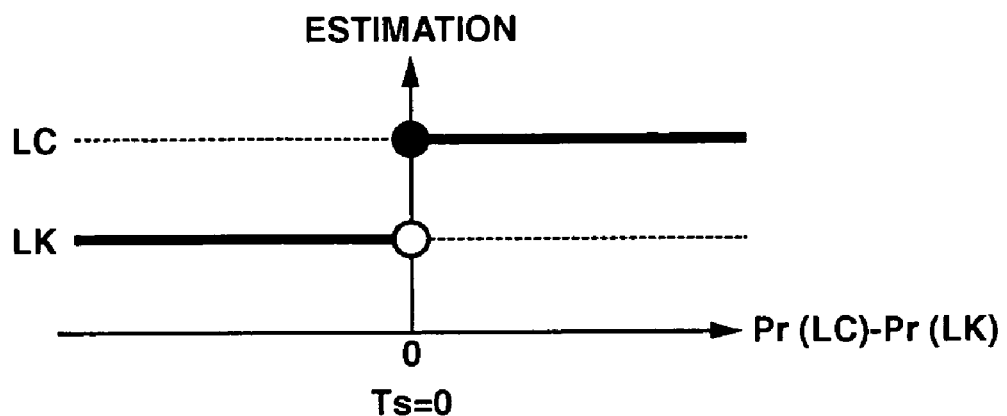
FIG. 10(a) is a diagram illustrating an estimation of a lane-changing intention by comparing the difference between a likelihood value of the lane-changing intention Pr(LC) and a likelihood value of a lane-keeping intention Pr(LK) to a threshold value Ts if the threshold value Ts is equal to 0 (zero).
Figure 10B:
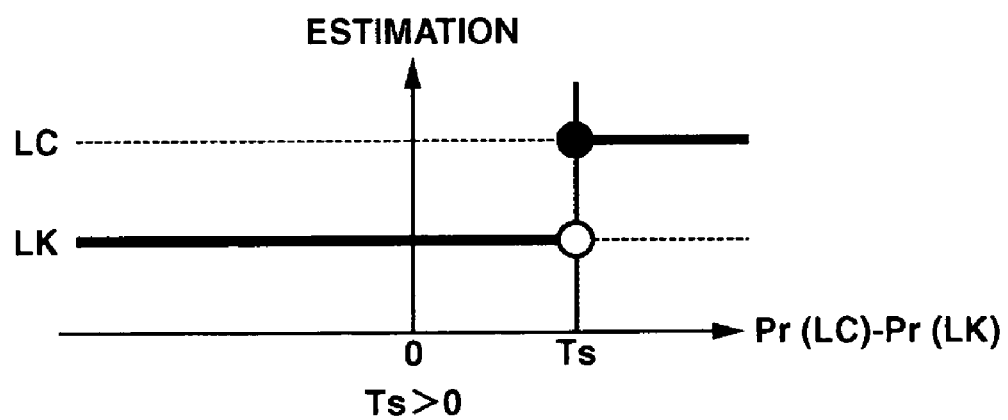
FIG. 10(b) depicts an estimation of a lane changing intention to avoid errors.
Figure 10C:
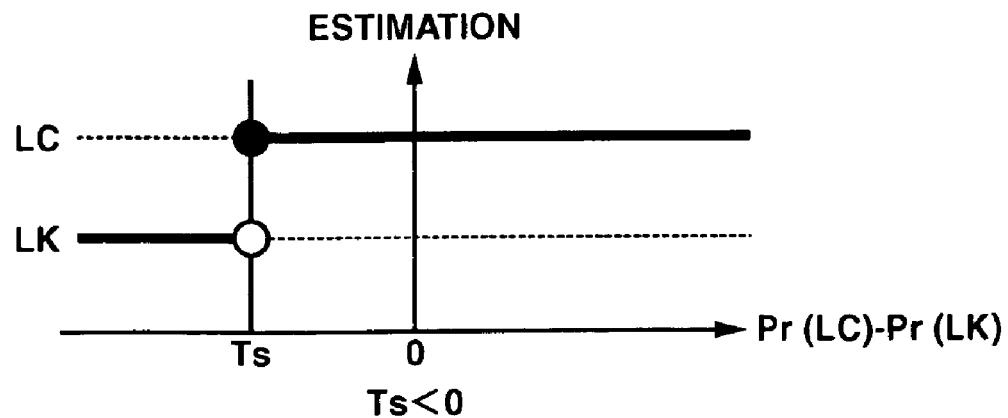
FIG. 10(c) illustrates a positive estimation of a lane-changing intention responsive to a high probability to leave a lane.

Referring to FIGS. 10(a) to 10(c), the horizontal axis represents the difference Pr(LC)–Pr(LK) and the vertical axis represents two-level estimation. Using these Figures, the threshold value Ts is explained in terms of its setting.

In FIG. 10(a), the setting of the threshold value Ts is such that Ts=0. Under this condition, if the difference Pr(LC)–Pr(LK) is greater than 0, it is estimated that a real driver's intention is a lane-changing intention. If the threshold value Ts were unaltered, it would be highly probable that lateral movement within a lane in passing a curved road would cause an increased probability of error in estimating a lane-changing intention rather than a lane-keeping intention possessed by the real driver. Thus, the threshold value Ts is altered based on a status of the vehicle and the running environment around the vehicle. For example, an in-lane lateral position y may be used to alter the threshold value Ts.

When the vehicle is traveling within a central region of a lane, the threshold value Ts becomes large to reduce the probability of making an error in estimating a lane-changing intention because it is less probable that the real driver wishes to change lanes. In this case, as shown in FIG. 10(b), if the difference Pr(LC)–Pr(LK) becomes greater than the threshold value Ts (Ts>0), it is estimated that the real driver's intention is a lane-changing intention. If this difference is less than or equal to the threshold value Ts (Ts>0), it is estimated that the real driver's intention is a lane-keeping intention. As a result, an accuracy of estimating a lane-changing intention is enhanced.

When the vehicle is traveling in the proximity of one of lane boundaries, the threshold value Ts is set small to allow aggressive estimations of a lane-changing intention because it is highly probable that the real driver wishes to change lanes. In this case, as shown in FIG. 10(c), if the difference Pr(LC)–Pr(LK) becomes greater than the threshold value Ts (Ts<0), it is estimated that the real driver's intention is a lane-changing intention. If this difference is less than or equal to the threshold value Ts (Ts<0), it is estimated that the real driver's intention is a lane-keeping intention. As a result, an accuracy of estimating a lane-changing intention is enhanced.

It is to be noted that the manner of calculating the lane-keeping intention and lane-changing intention likelihood values Pr(LK) and Pr(LC) is not limited to that employed by the first exemplary implementation. For example, a collective degree of similarity Pids of each of imaginary drivers is calculated based on a series of present and past data. The present data is a present degree of similarity Pid indicative of closeness between the present operation of the imaginary driver and the present operation of the real driver. Each of the past data is a past degree of similarity Pid indicative of closeness between the past operation of the imaginary driver and the past operation of the real driver. In this manner, the collective degrees of approximation, each for one of different intentions, are calculated. Based on them, a lane-changing intention likelihood value Pr(LC) and a lane-keeping intention likelihood value Pr(LK) are calculated.

Instead of calculating the lane-changing and lane-keeping intention likelihood values Pr(LC) and Pr(LK) after comparing the operation Oid of each of imaginary drivers to the operation Ord of the real driver, the lane-changing and lane-keeping intention likelihood values Pr(LC) and Pr(LK) may be calculated from closeness between each of driving patterns obtained by learning and a driving pattern of a real driver. The driver's intention likelihood values may be calculated based on at least one of a status of the host vehicle, running environment around the vehicle and an operation of a real driver. Examples of detecting a real driver's intention by pattern recognition include, for example, a Support Vector Machine (SVM) and a Relevance Vector Machine (RVM). A Hidden Markov Model (HMM) may be used for the estimation.

Each of the SVM and RVM requires learning of appropriate driving patterns of objects to be discriminated (in this example, a lane-keeping intention and a lane-changing intention). In practical recognition, a driving pattern of a real driver is received, on real time basis, and a lane-changing intention score Sc based on closeness between the driving pattern of the real driver and each of the driving patterns obtained previously by learning. Comparing the lane-changing intention score Sc to a threshold value T allows an estimation about whether the rear driver's intention is a lane-keeping intention or a lane-changing intention. Setting the threshold value T in response to status of the vehicle and running environment around the vehicle provide substantially the same effect as that provided by each of the first to fifth exemplary implementations.

Instead of the lane-changing intention score Sc expressed by Eq. 9, a lane-changing intention Sc may be expressed as:

$$Sc=1/\{1+\exp(-2 \times k \times Pr(LC)/Pr(LK))\} \qquad \text{(Eq. 11)}$$

where: k is a coefficient.

It is to be noted that the threshold value T may be set using appropriate combination of the features taught by the first to fourth exemplary implementations.

Sixth Exemplary Implementation

Figure 11:
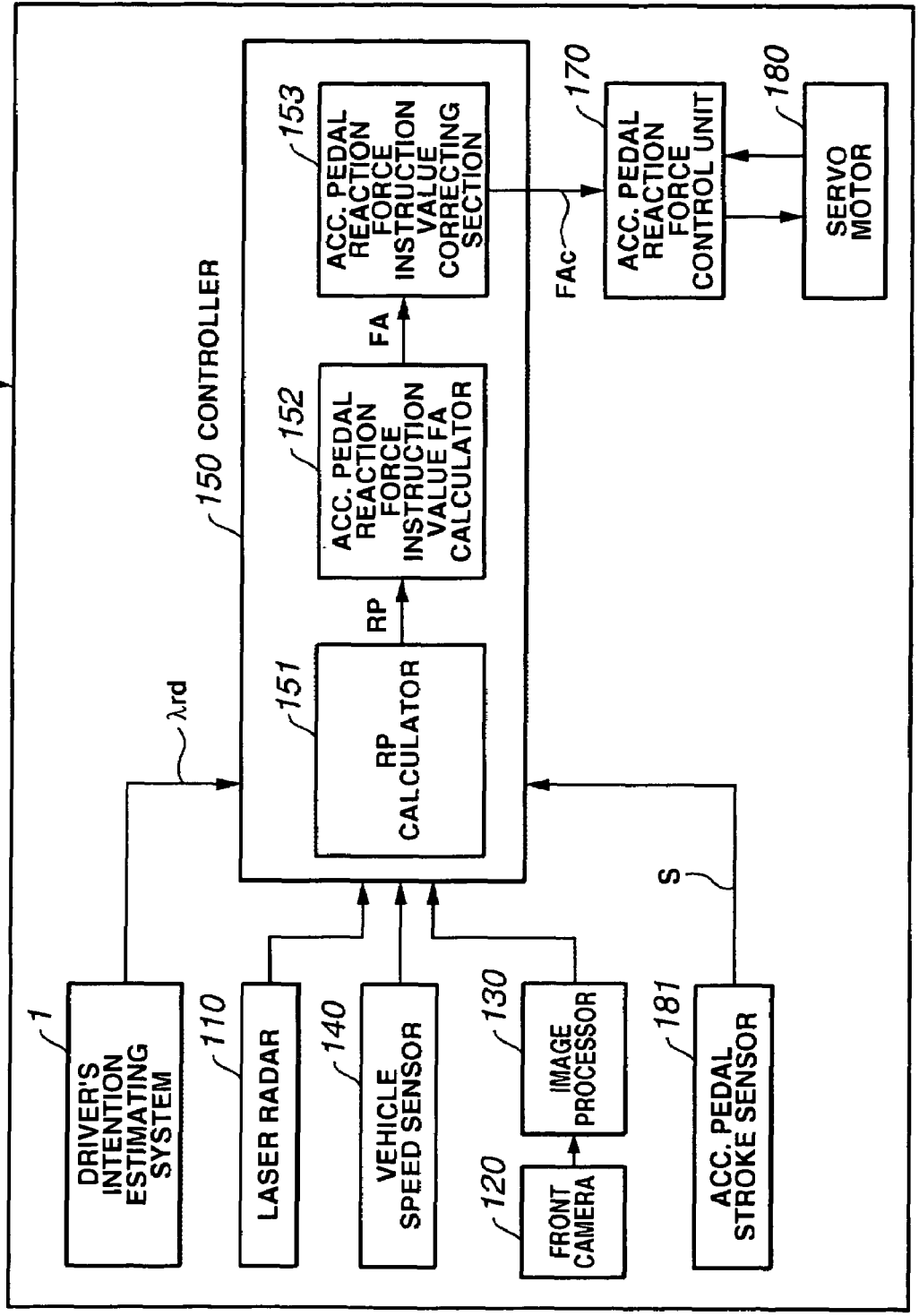
FIG. 11 is a block diagram illustrating an exemplary implementation of a driver assisting system according to the present disclosure.
Figure 12:
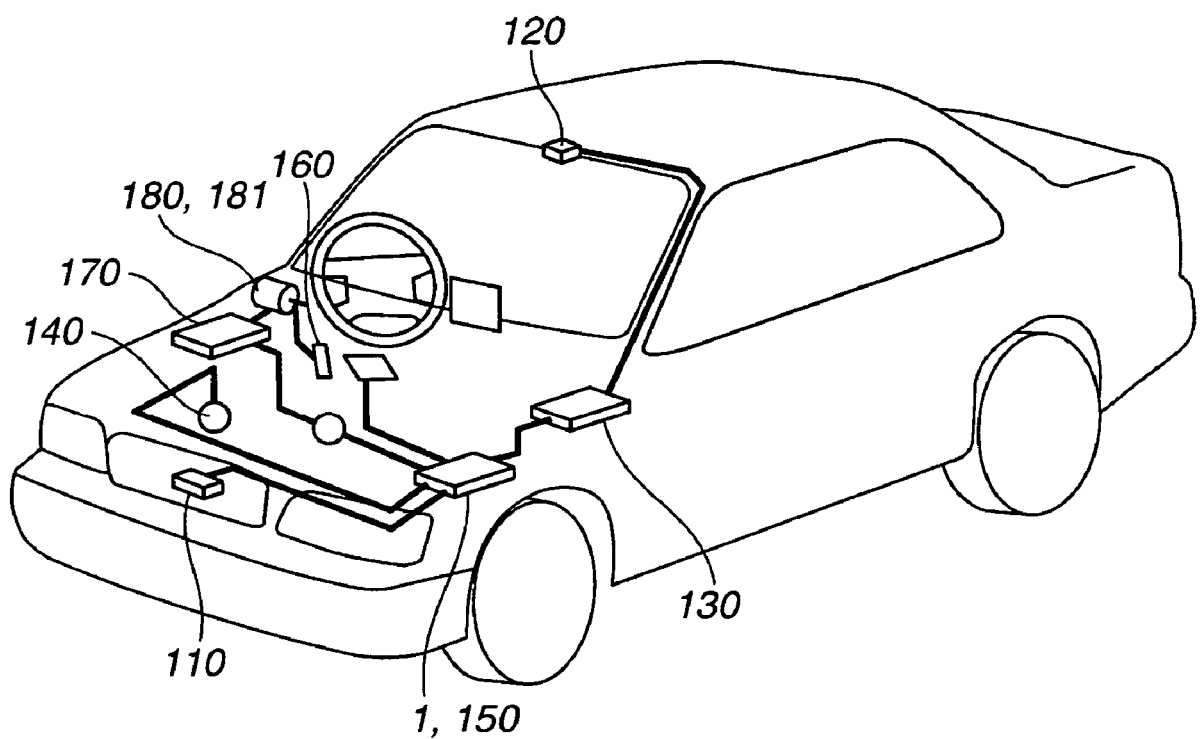
FIG. 12 is a perspective view of an automobile incorporating a driver assisting system.

Referring to the accompanying drawings, the sixth exemplary implementation of a driver assisting system is described. FIG. 11 is a bock diagram illustrating the sixth exemplary implementation of a driver assisting system 100. FIG. 12 is a perspective view of a vehicle in the form of an automobile incorporating the driver assisting system 100. The illustrated driver assisting system 100 assists the driver based on the result of estimation made by the driver's intention estimating system 1 in the manner as described in the first to fifth exemplary implementations.

Detailed descriptions of driver assisting systems are provided in U.S. published Patent Application No. 2003/0060936 A1, published Mar. 27, 2003, the disclosure of which in incorporated herein by reference in its entirety.

Figure 13:
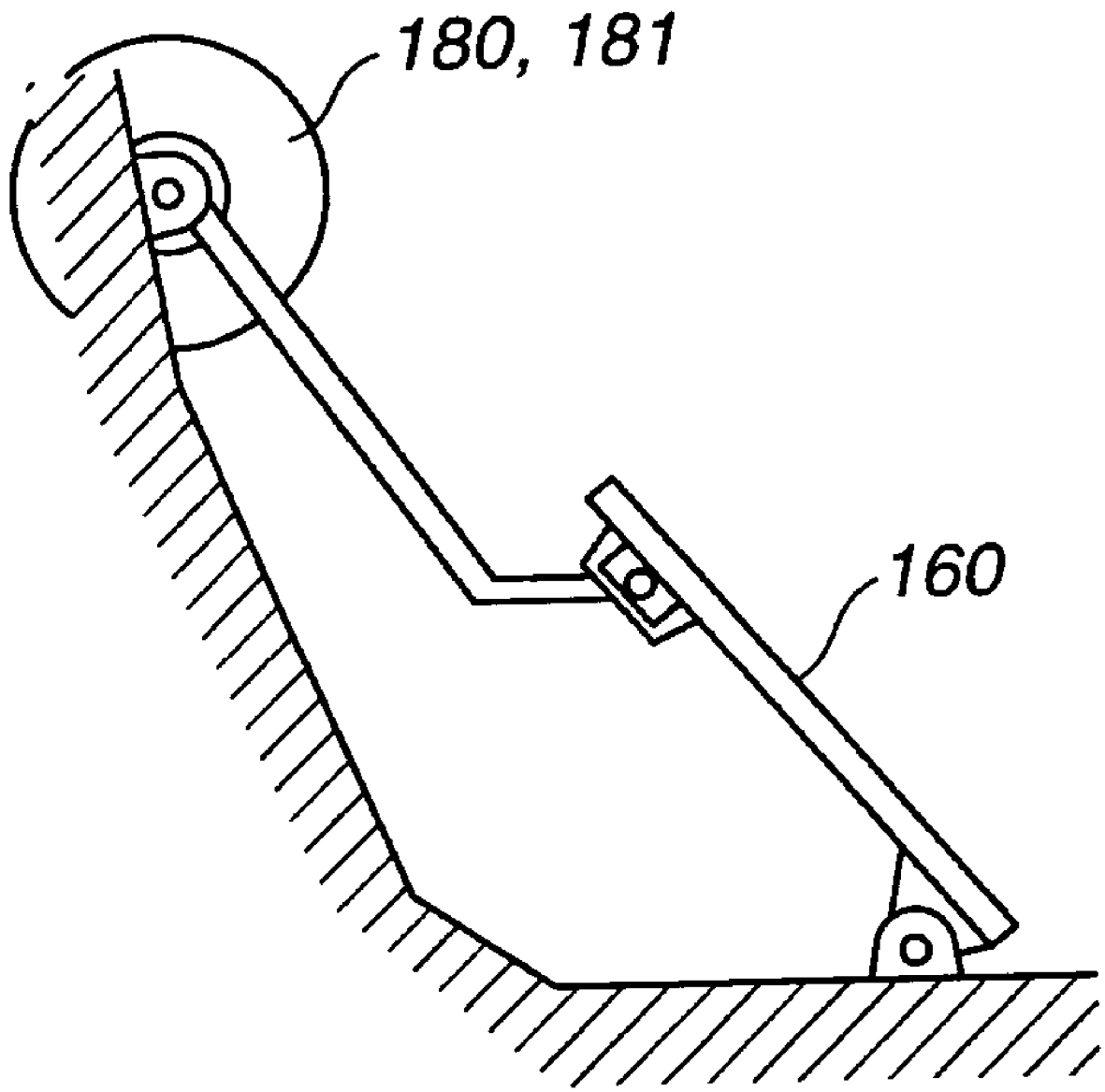
FIG. 13 depicts a driver-controlled device, in the form of an accelerator pedal.

Referring to FIGS. 12 and 13, the driver assisting system 100 includes a laser radar 110. As shown in FIG. 12, the laser radar 110 is mounted to the vehicle at a front bumper or a front grille. It scans horizontally and laterally about 6 degrees to each side relative to an axis parallel to the vehicle longitudinal centerline, and propagates infrared pulses forwardly and receives the reflected radiation by an obstacle, such as, a rear bumper of a preceding vehicle. The laser radar 110 provides a distance d to a preceding vehicle in front and a relative speed Vr to the preceding vehicle. The laser radar 110 provides, as outputs, the detected distance D and relative speed Vr to a controller 150.

The driver assisting system 100 also includes a front camera 120. The front camera 120 is of the CCD type or CMOS type and mounted to the vehicle in FIG. 13 in the vicinity of the internal rear view mirror to acquire image data of a region in front of the vehicle. The front camera 120 provides, as output signals, the acquired image data to an image processor 130. The image processor 130 provides the processed image data to the controller 150. The region covered by the front camera 120 extends from the camera axis to each side by 30 degrees.

The driver assisting system 100 also includes a vehicle speed sensor 140. The vehicle speed sensor 140 detects a vehicle speed of the host vehicle by measuring the number of revolutions of a road wheel or an output element of a transmission. The vehicle speed sensor 140 provides the detected vehicle speed to the controller 150.

The driver assisting system 100 also includes a driver's intention estimating system 1. The driver's intention estimating systems, which are illustrated in FIGS. 1 to 10, may be used in the driver assisting system 100 to provide, as an output, an estimated real driver's intention λrd and a threshold value T to the controller 150.

The controller 150, which is responsible for information processing within the driver assisting system 100, may contain a microprocessor including a central processing unit (CPU), a read only memory (ROM), and a random access memory (RAM). The controller 150 includes, for example, software implementation of a risk potential (RP) calculator 151, an accelerator pedal reaction force instruction value FA calculator 152, and an instruction value FA correcting section 153.

The RP calculator 151 calculates a risk potential (RP) that may perceived by a real driver in connection with the vehicle's environment based on a vehicle speed V1 of the host vehicle, a distance D to the preceding vehicle, and a relative speed Vr to the preceding vehicle, which are given by processing output signals of the laser radar 110, vehicle speed sensor 140 and image processor 130. The RP calculator 151 provides, as an output, the risk potential RP to the accelerator pedal reaction force instruction value FA calculator 152.

The accelerator pedal reaction force instruction value FA calculator 152 calculates an accelerator pedal reaction force instruction value FA based on the risk potential RP. The accelerator pedal reaction force instruction value FA calculator 152 provides the accelerator pedal reaction force instruction value FA to the instruction value FA correcting section 153.

The instruction value FA correcting section 153 corrects the accelerator pedal reaction force instruction value FA based on the estimated driver's intention λrd and the threshold value T, which are provided by the driver's intention estimating system 1, to give a corrected accelerator pedal reaction force instruction value FAc. The instruction value FA correcting section 153 provides, as an output, the corrected accelerator pedal reaction force instruction value FAc to an accelerator pedal reaction force control unit 170.

In response to the corrected accelerator pedal reaction force instruction value FAc, the accelerator pedal reaction force control unit 170 regulates a servo motor 180 of an accelerator pedal 160. As shown in FIG. 13, the servo motor 180 is included by a link mechanism of the accelerator pedal 160. The link mechanism also includes an accelerator pedal stroke sensor 181. The servo motor 180 may provide any desired torque and any desired angular position in response to an instruction from the accelerator pedal reaction force control unit 170. The accelerator pedal stroke sensor 181 detects an accelerator pedal stroke or position S of the accelerator pedal 160 by measuring an angle of the servo motor 180. The angle of the servo motor 180 corresponds to the accelerator pedal stroke S because the servo motor 180 and the accelerator pedal 160 are interconnected by the link mechanism.

For better understanding of the accelerator pedal of the above kind, reference should be made to U.S. Published Patent Application Nos. 2003/0236608 A1 (published Dec. 25, 2003) and US 2003/0233902 A1 (published Dec. 25, 2003), the disclosures of which are incorporated herein by reference in their entireties.

When the accelerator pedal reaction force control unit 170 is not altering the reaction force, the reaction force increases linearly as the accelerator pedal stroke S increases. This ordinary reaction force varying characteristic is accomplished by a spring force provided by a torque spring arranged at the center of movement of the accelerator pedal 160.

Next, it is described how the sixth exemplary implementation of driver assisting system 100 works.

The controller 150 regulates an accelerator pedal reaction force input to the driver via the accelerator pedal 160 based on a risk potential RP around the host vehicle, that is, a risk potential derived from the preceding vehicle in front of the host vehicle. The accelerator pedal reaction force corresponding to an estimated lane-changing intention is set as lower than the accelerator pedal reaction force corresponding to a lane-keeping intention. Specifically, the accelerator pedal reaction force is regulated based on the quality of estimated lane-changing intention, that is, the threshold value T used in estimating the lane-changing intention.

The accelerator pedal reaction force is regulated based on the result from comparing the threshold value T to a predetermined value P (for example, 0.5). When the threshold value T is greater than the predetermined value P, the frequency of an erroneous estimation of lane-changing intention is reduced. However, the estimation speed of lane-changing intention becomes slow although the accuracy is increased. When the threshold value T is lower than the predetermined value P, the frequency in an erroneous estimation of lane-changing intention becomes high although the estimation timing of lane-changing intention increases. The table shown in FIG. 14 tabulates the above-mentioned results of comparing the threshold value T to the predetermined value P.

The accelerator pedal reaction force is adjusted to compensate for a delay in estimation timing if the threshold value T is great based on an estimation of lane-changing intention as the driver's estimated intention.

Figure 15:
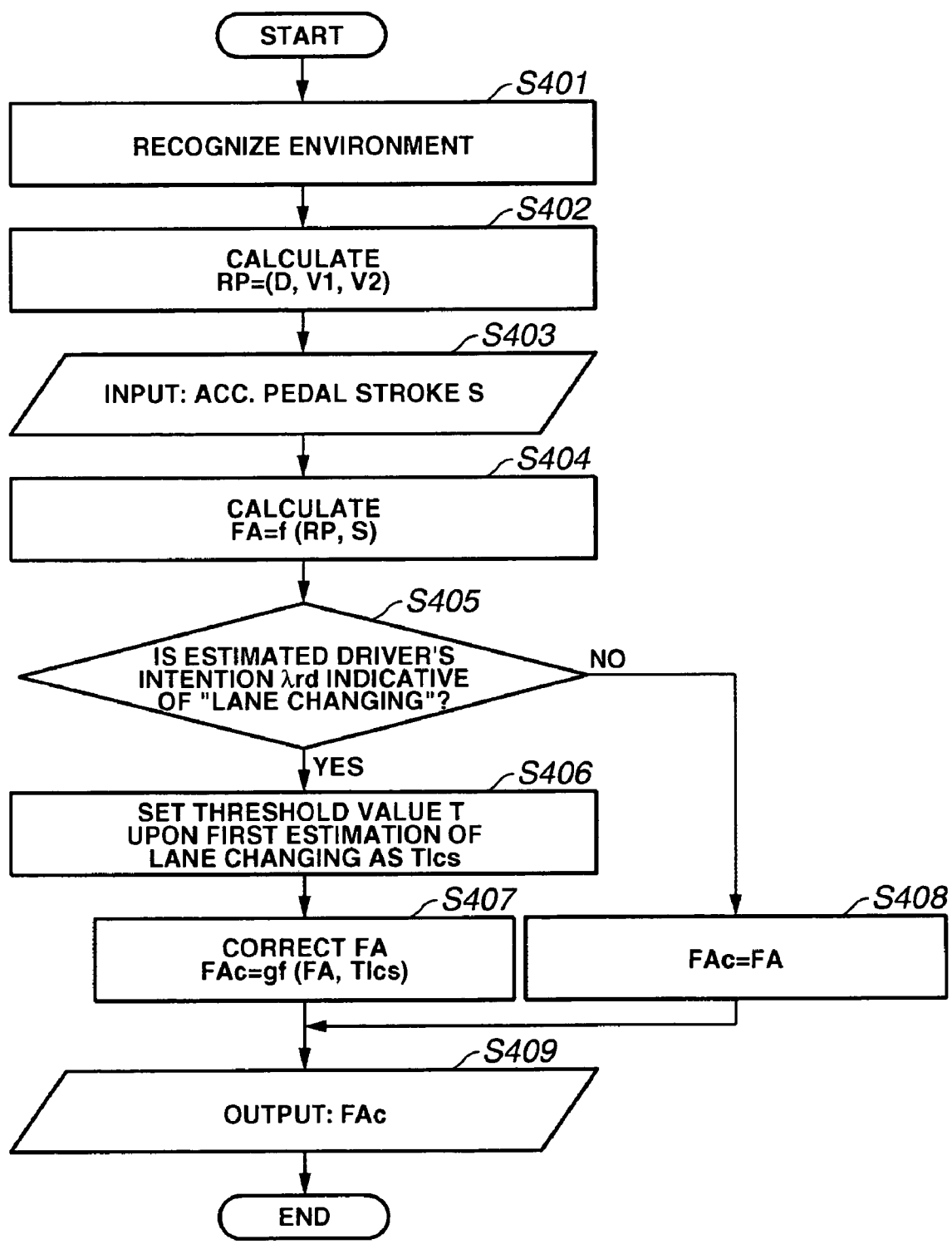
FIG. 15 is a flow chart illustrating the operation of the driver assisting system illustrated in FIG. 11.

The following description along with FIG. 15 provides more understanding of how the driver assisting system 100 works. The flow chart in FIG. 15 illustrates a control routine of a driver assisting control program stored in the controller 150. The execution of the control routine is repeated at a regular interval of, for example, 50 msec.

In FIG. 15, at step S401, the controller 150 recognize environment in a field around the host vehicle. In particular, the controller 150 receives, as inputs, signals of the laser radar 110, front camera 120 and vehicle speed sensor 140 by reading operations to acquire data regarding the vehicle's status and the vehicle's environment. In a traffic scene where the host vehicle is following the preceding vehicle, the acquired data may include a distance D to the preceding vehicle, a vehicle speed V1 of the host vehicle, a vehicle speed V2 of the preceding vehicle.

At step S402, the controller 150 calculates a risk potential RP derived from the surrounding environment based on the acquired data at step S401. In this exemplary implementation, in order to calculate a risk potential RP is derived based on the surrounding environment, the controller 150 calculates a time to collision TTC to the preceding vehicle and a time headway THW with respect to the preceding vehicle.

The TTC is a measure of time from a present or current point in time to a future point in time when the distance D becomes zero if a relative speed Vr (Vr=V2−V1) to the preceding vehicle remains unchanged. The TTC may be expressed as:

$$TTC = -D/Vr \qquad \text{(Eq. 12)}$$

The smaller the value of TTC, the more imminent is the collision and the larger is the value of a degree of approach to the preceding vehicle. In the traffic scene where the host vehicle is following the preceding vehicle, most vehicle drivers perceives a high degree of risk and initiates deceleration to avoid collision well before the TTC becomes less than 4 seconds.

The time headway THW quantifies a degree of influence on the TTC by an unpredictable drop in the vehicle speed of the preceding vehicle. The THW is a measure of a timer that is set to count up when the preceding vehicle reaches a point on a road and is reset subsequently when the host vehicle will reach the same point. The THW may be expressed as:

$$THW = D/V1 \qquad \text{(Eq. 13)}$$

In the case where the host vehicle is following the preceding vehicle, the vehicle speed V2 of the preceding vehicle may be used instead of the vehicle speed V1 in the above-mentioned equation Eq. 13.

The relationship between the two notions TTC and THW is such that a change in vehicle speed V2, if any, of the preceding vehicle results in a small change in the TTC when the THW is long, but the same change in vehicle speed V2 of the preceding vehicle results in a large change in the TTC when the THW is short.

In this exemplary implementation, the risk potential RP calculated at step S402 using the time to collision TTC and the time headway THW. The risk potential RP may be expressed as:

$$RP = a/THW + b/TTC \qquad \text{(Eq. 14)}$$

where: b and a (b>a) are parameters weighting 1/TTC and 1/THW, respectively, such that 1/THW is less weighted than 1/TTC. The values of b and a are optimized after accounting for a statistics of values of THW and TTC collected in a traffic scene including the host vehicle following the preceding vehicle. In this exemplary implementation, b=8 and a=1.

At step S403, the controller 150 receives an accelerator pedal stroke S by reading operation of the output of the accelerator pedal stroke sensor 181.

At step S404, the controller 150 calculates an accelerator pedal reaction force instruction value FA. First, the controller 150 calculates a reaction force increment ΔF in response to the risk potential RP by, for example, referring to the characteristic curve shown in FIG. 16.

Figure 16:
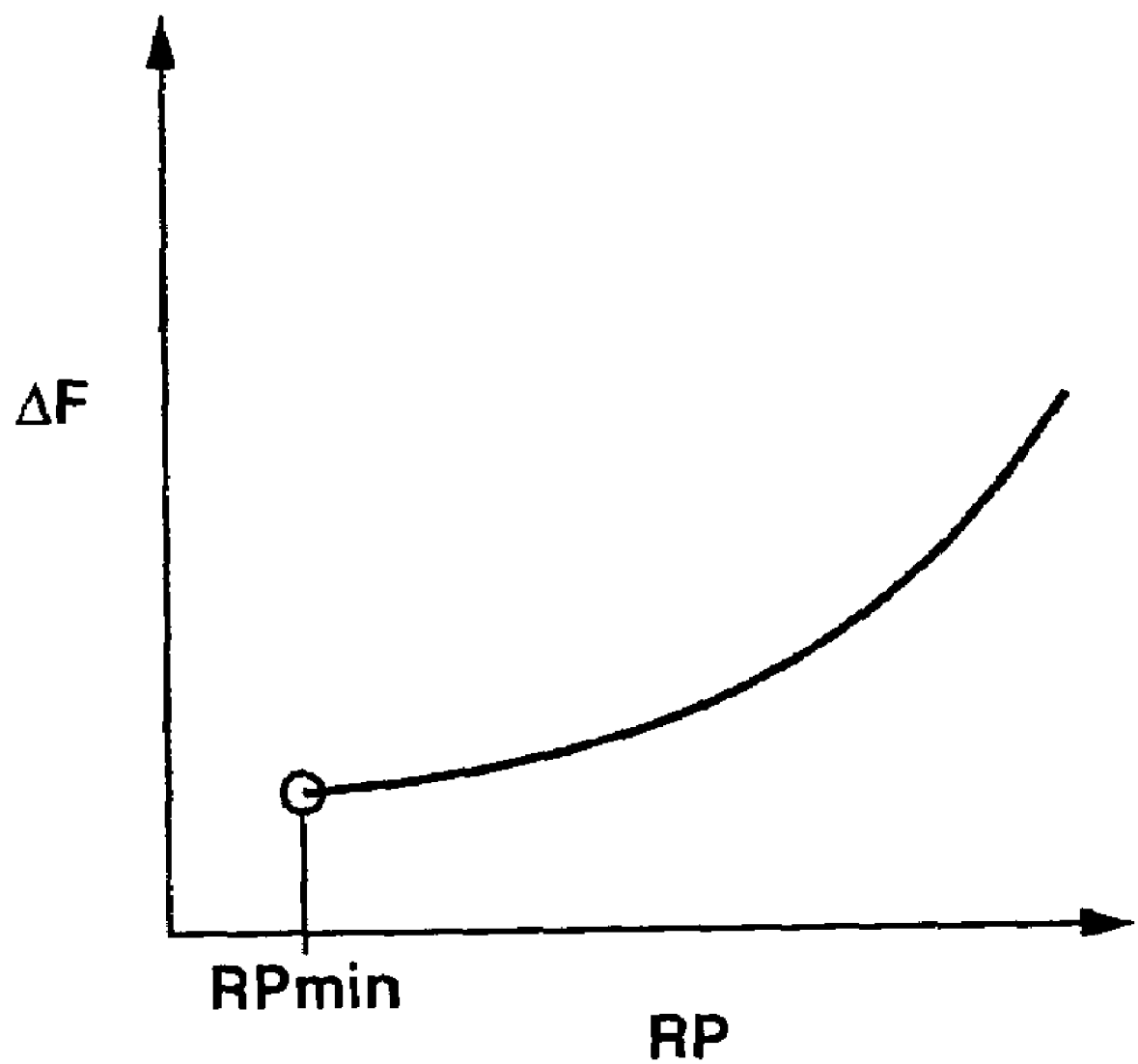
FIG. 16 depicts values of a reaction force increment $\Delta F$ relative to different values of risk potential RP.

The characteristic curve in FIG. 16 shows values of reaction force increment ΔF with respect to different values of risk potential RP. When the risk potential RP is smaller than a minimum value RPmin, the reaction-force increment ΔF set as zero in order to prevent unnecessary information from being presented to the driver. An appropriate value is predetermined as the minimum value RPmin.

Within a region where the risk potential RP exceeds the minimum value RPmin, the reaction force increment ΔF increases exponentially as the risk potential RP increases. The reaction force increment ΔF within this region may be expressed as:

$$\Delta F = k \cdot RP^n \qquad \text{(Eq. 15)}$$

where: k and n are constants that are appropriately determined based on results obtained by drive simulator and field drive to provide smooth conversion of the risk potential RP to the reaction force increment ΔF.

The controller 150 calculates the sum of the reaction force increment ΔF and the ordinary reaction force characteristic to provide an accelerator pedal reaction force instruction value FA.

At step S405, the controller 150 determines whether or not the estimated driver's intention λrd is indicative of a lane-changing intention. If this is the case, the program proceeds to step S406.

At step S406, the controller 150 sets a threshold value T upon a first estimation of a lane-changing intention as Tlcs by performing a reading operation of the threshold value T. If the lane-changing intention has been estimated immediately before the current cycle, the controller 150 reads a threshold value T provided by the driver's intention estimating system 1 and sets this threshold value as Tlcs. If the available lane-changing intention was estimated before the previous cycle, the controller 150 reads in the threshold value Tlcs.

At the subsequent step S407, the controller 150 corrects the accelerator pedal reaction force instruction value FA calculated at step S404 based on the threshold value Tlcs set at step S406 to give a corrected accelerator pedal reaction force instruction value FAc. In this exemplary implementation, the accelerator pedal reaction force instruction value FA is processed by a low-pass filter and damped.

The corrected accelerator pedal reaction force instruction value FAc may be expressed as:

$$\begin{aligned} FAc &= gf(FA) \\ &= kf \cdot \{1/(1 + af \cdot Tsf) \cdot FA \end{aligned} \qquad \text{(Eq. 16)}$$

In the Eq. 16, kf is an appropriately determined constant, af is a coefficient and Tsf is a time constant upon damping the accelerator pedal reaction force instruction value FA. The coefficient af that is multiplied with the time constant Tsf is set after referring to the fully drawn line in FIG. 17 using the threshold value Tlcs set at step S405.

Figure 17:
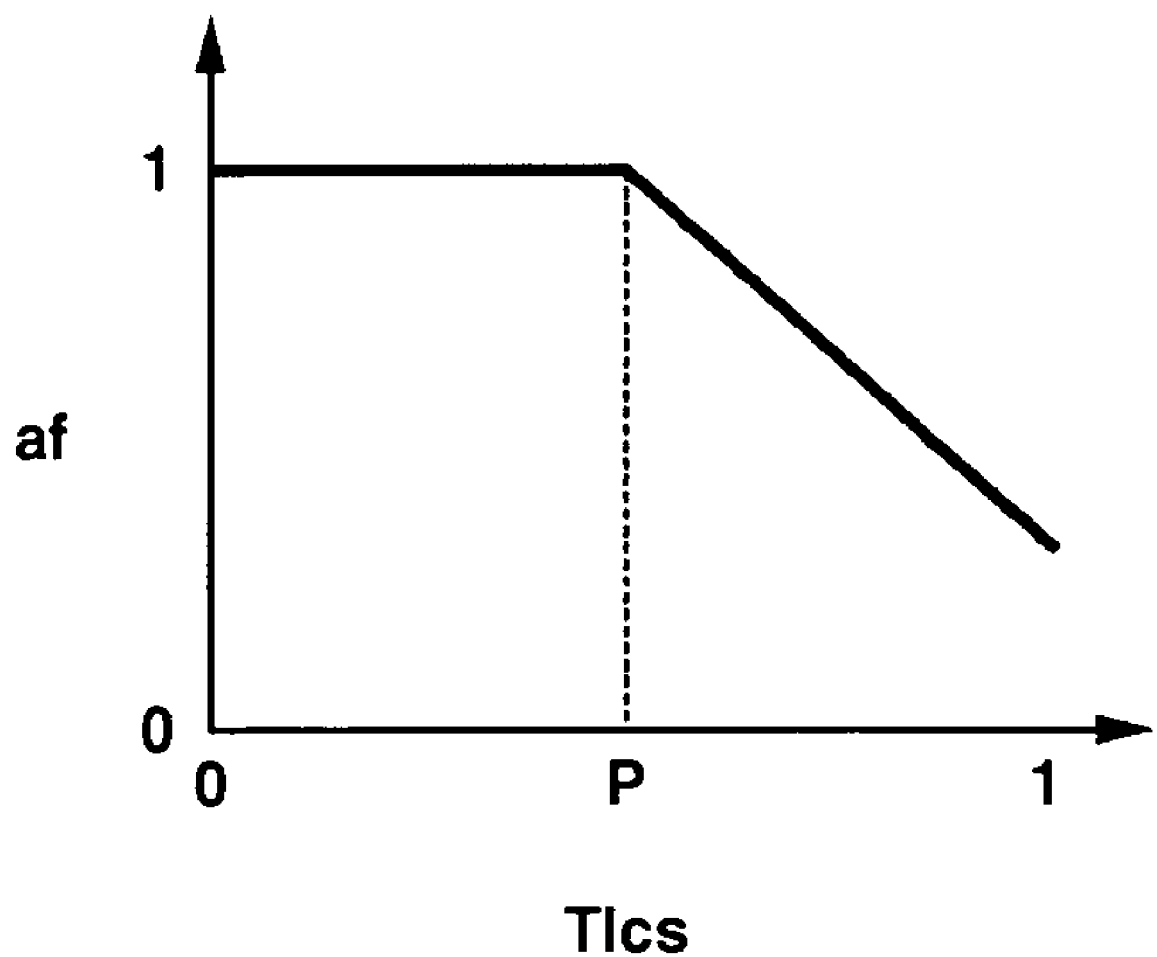
FIG. 17 illustrates values of a coefficient (af), multiplied with a time constant (Tsf), relative to different values of a threshold value (Tlcs) that may be set upon a first estimation of a lane-changing intention.

FIG. 17 shows values of the coefficient af relative to different values of threshold Tlcs. If the threshold value Tlcs is less than the predetermined value P, the coefficient af is set equal to 1 because the estimation speed of a lane-changing intention is fast. If the threshold value Tlcs is greater than the predetermined value P, the coefficient af becomes small as the threshold value Tlcs increases because the estimation speed of a lane-changing intention is slow. As the threshold value Tlcs increases, the time constant term (af·Tsf) becomes small, making it possible to quickly damp the accelerator pedal reaction force. The threshold value Tlsc may be set directly in response to the time constant Tsf alone.

If, at step S405, the controller 150 determines that the estimated driver's intention λrd is indicative of a lane-keeping intention, the program proceeds to S408.

At step S408, the controller 150 sets the accelerator pedal reaction force instruction value FA as the corrected accelerator pedal reaction force instruction value FAc, which is used for the subsequent control.

At the next step S409, the controller 150 provides, as an output, the corrected accelerator pedal reaction force instruction value FAc that has been determined at step S407 or S408 to the accelerator pedal reaction force control unit 170. The accelerator pedal reaction force control unit 170 controls the servo motor 180 in response to the corrected accelerator pedal reaction force instruction value FAc. The present cycle ends with step S409.

In addition to the previously described effects in connection with the first to fifth exemplary implementations, the sixth exemplary implementation provides effects as follows:

(1) The controller 150 calculates risk potential RP based on the state of obstacle(s) around the vehicle, and regulates a reaction force associated with a driver-controlled input device, such as an accelerator pedal 160, based on the calculated risk potential RP. In this case, the reaction force applied to the accelerator pedal 160 is corrected based on a result of estimation of a driver's intention by the driver's intention estimating system 1 and the lane-changing estimating threshold value T. This approach allows regulation of the reaction force adaptive to the driver's intention, and forwarding the risk potential RP to the driver. As the lane-changing estimating threshold value T is used as an input to the reaction force regulation, when the lane-changing intention is estimated by the driver's intention estimating system 1, the performance of the driver assisting system is compensated for a change of the driver's estimated intention.

(2) The controller 150 corrects the relationship between the risk potential and reaction force, that is, an accelerator pedal reaction force instruction value FA, based on the result of estimation of a driver's intention and the lane-changing intention estimating threshold value T. In one embodiment, the accelerator pedal reaction force instruction value FA is set to a lower value when the driver's intention estimating system 1 estimates a lane-changing intention, and to a higher value when the driver's intention estimating system 1 estimates otherwise. The accelerator pedal reaction force instruction value FA is set to a lower value when the threshold value T and to a higher value when the threshold value T is small. When the estimated driver's intention is a lane-changing intention, the driver's operation on the accelerator pedal 160 is not hampered by lowering the accelerator pedal reaction force. If the threshold value T is large, the estimation accuracy is high, but the calculation speed is reduced. Referring to FIG. 17, when the threshold value T is large, the coefficient af applied to the time constant Tsf is set to a small value, allowing a quick damping of the accelerator pedal reaction force.

Seventh Exemplary Implementation

Figure 18:
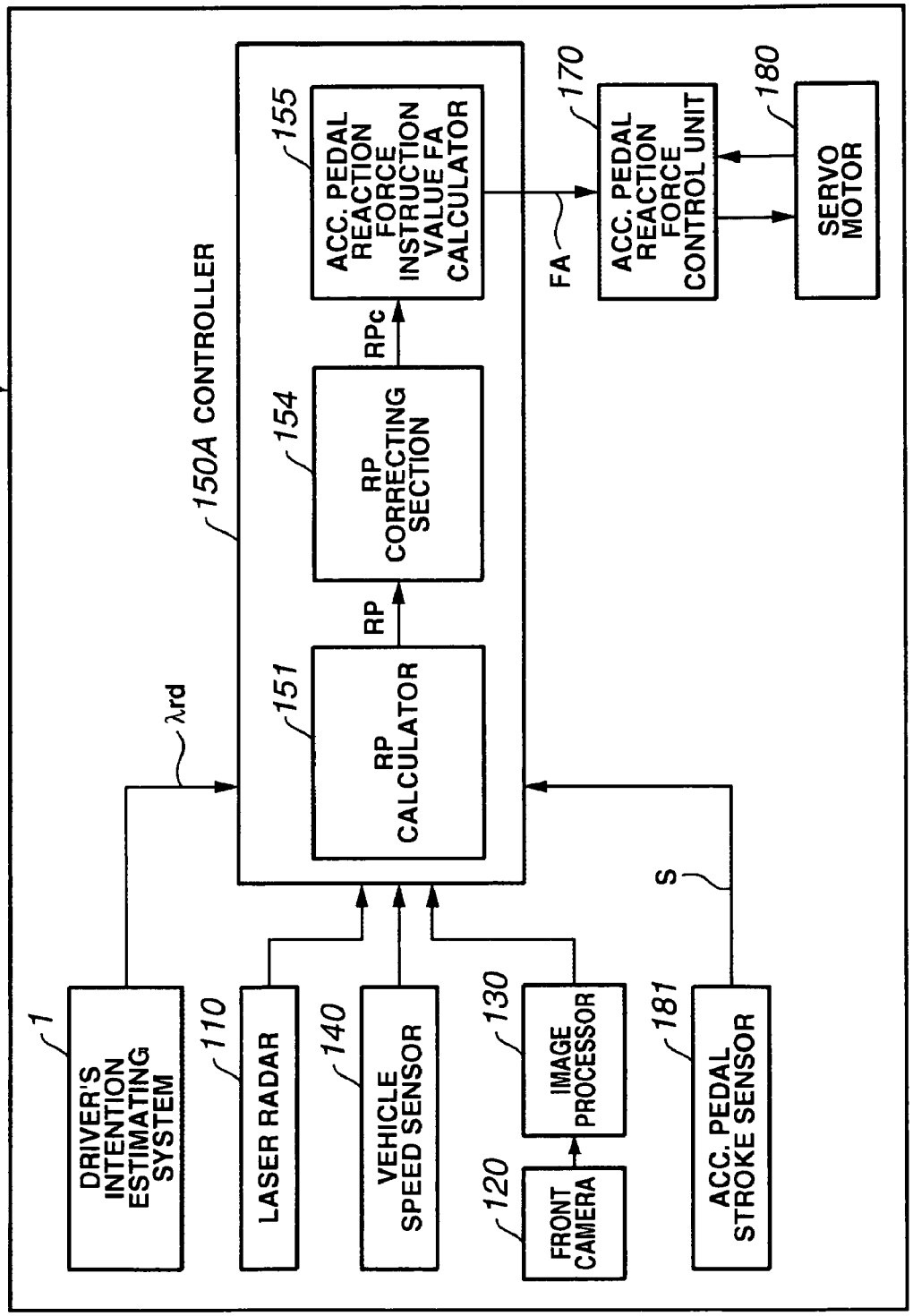
FIG. 18 is a block diagram of another exemplary implementation of a driver assisting system according to the present disclosure.

Referring to FIG. 18, the seventh exemplary implementation of a driver assisting system 200 according to the present disclosure is described. The driver assisting system 200 is substantially the same as the sixth exemplary implementation of the driver assisting system 100. Thus, like reference numerals are used to designate like parts or portions throughout FIGS. 12 and 18. However, the driver assisting system 200 is different from the driver assisting system 100 in the following respects:

The driver assisting system 200 corrects a risk potential RP upon a determination that the estimated driver's intention λrd is indicative of a lane-changing intention. The driver assisting system 200 includes a controller 150A. The controller 150A is provided with a software implementation of a risk potential (RP) calculator 151, a risk potential (RP) correcting section 154, and an accelerator pedal reaction force instruction value FA calculator 155.

Figure 19:
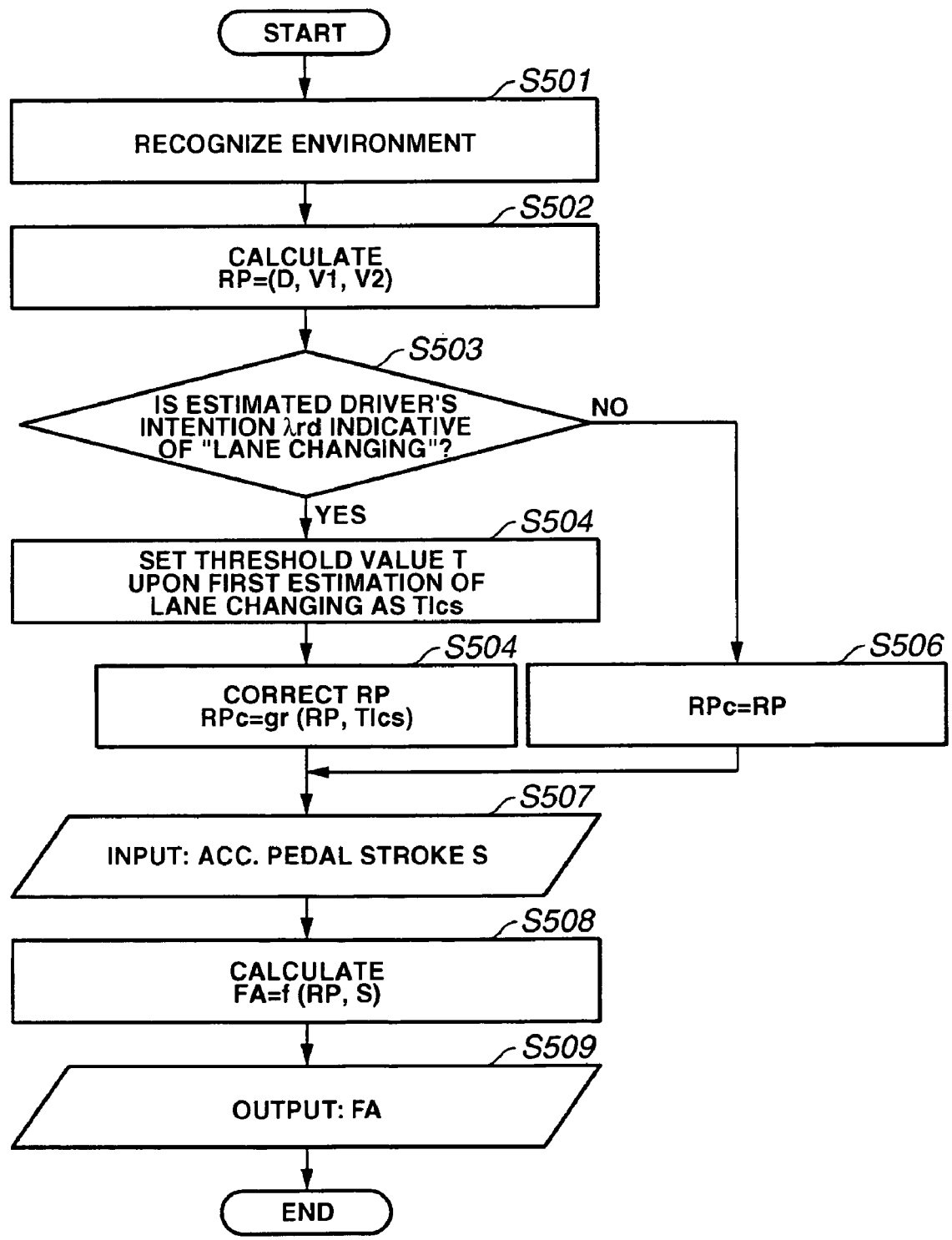
FIG. 19 is a flow chart illustrating the operation of the driver assisting system shown in FIG. 18.

The operation of the driver assisting system 200 is described in detail using the flow chart in FIG. 19. The flow chart in FIG. 19 illustrates a control routine of a driver assisting control program stored in the controller 150A. The execution of the control routine is repeated at a regular interval of, for example, 50 msec. The flow chart illustrated in FIG. 19 has steps S501 and 502, which correspond to the steps S401 and S402 of the flow chart illustrated in FIG. 15. Thus, the controller 150A performs substantially the same steps down to step S502.

At step S503, the controller 150A determines whether or not the estimated driver's intention λrd is indicative of a lane-changing intention. If this is the case, the program proceeds to step S504.

At step S504, the controller 150A sets a threshold value T upon first estimation of a lane-changing intention as Tlcs by performing a reading operation of the threshold value T. If the lane-changing intention has been estimated immediately before the current cycle, the controller 150 reads a threshold value T provided by the driver's intention estimating system 1 and sets this threshold value as Tlcs. If the available lane-changing intention was estimated before the previous cycle, the controller 150A reads in the threshold value Tlcs.

At step S505, the controller 150A corrects the risk potential RP calculated at step S502 based on the threshold value Tlsc set at step S504 to provide a corrected risk potential RPc. In this exemplary implementation, the risk potential RP is processed by a low-pass filter and damped. The corrected risk potential RPc may be expressed as:

$$RPc = gr(RP) \qquad \text{(Eq. 17)}$$
$$= kr \cdot \{1/(1 + ar \cdot Tsr)\} \cdot RP$$

In the Eq. 17, kr is an appropriately determined constant, ar is a coefficient and Tsr is a time constant upon damping the risk potential RP. The coefficient ar that is multiplied with the time constant Tsr is set after referring to the fully drawn line in FIG. 20 using the threshold value Tlcs set at step S504.

Figure 20:
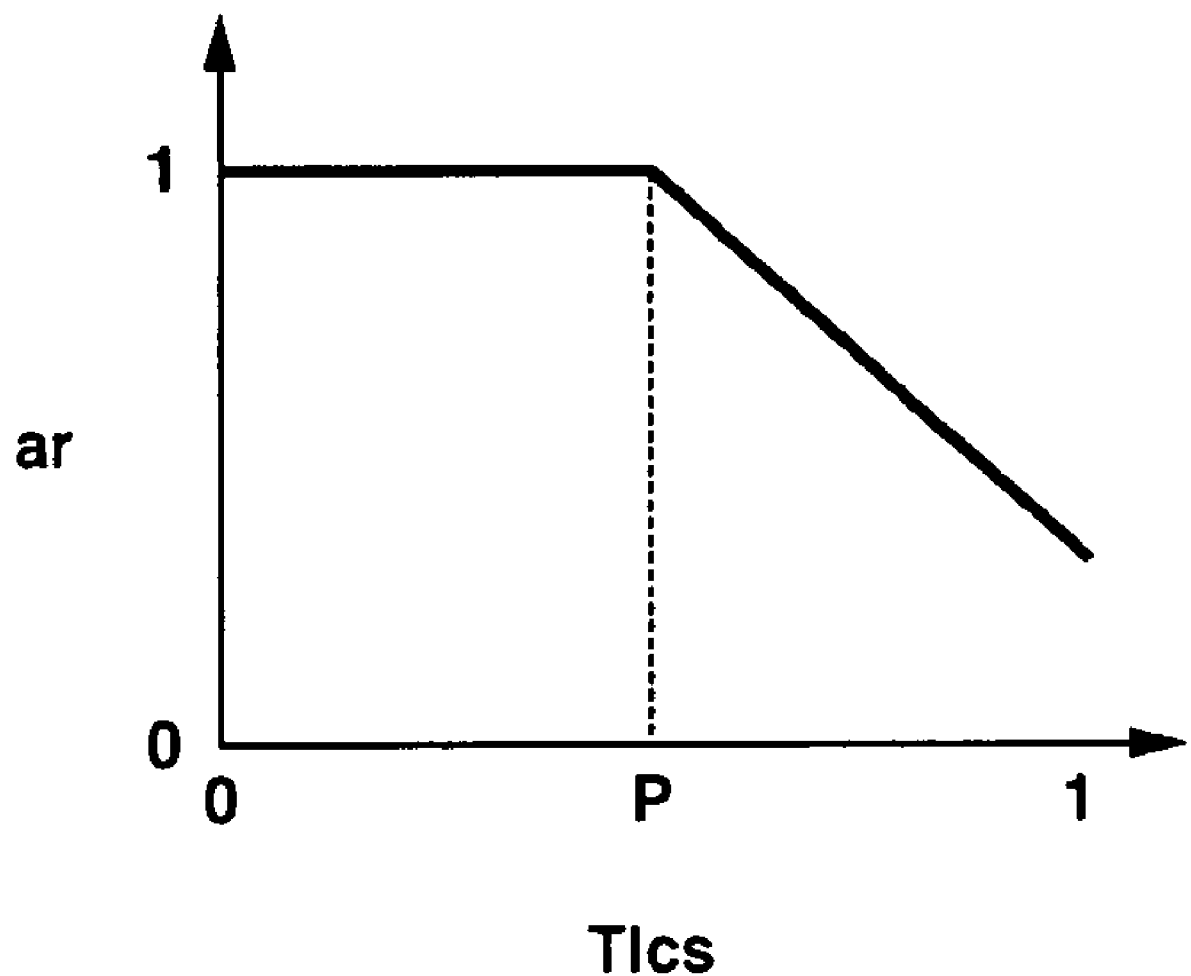
FIG. 20 depicts changes of a coefficient (ar), multiplied with a time constant (Tsr), relative to different values of a threshold (Tlcs).

FIG. 20 shows values of the coefficient ar relative to different values of threshold Tlcs. If the threshold value Tlcs is less than the predetermined value P, the coefficient ar is set equal to 1 because the estimation speed of a lane-changing intention is fast. If the threshold value Tlcs is greater than the predetermined value P, the coefficient ar becomes small as the threshold value Tlcs increases because the estimation speed of a lane-changing intention is slow. As the threshold value Tlcs increases, the time constant term (ar·Tsr) becomes small, making it possible to quickly damp the risk potential RP. In one embodiment, the threshold value Tlcs may be directly set in response to the time constant Tsf alone.

If, at step S503, the controller 150A determines that the estimated driver's intention λrd is indicative of a lane-keeping intention, the program proceeds to S506.

At step S506, the controller 150A sets the risk potential RP as the corrected risk potential RPc.

At the next step S507, the controller 150A receives an accelerator pedal stroke S by reading an operation of the output of the accelerator pedal stroke sensor 181.

At step S508, the controller 150A calculates an accelerator pedal reaction force instruction value FA. First, the controller 150A calculates a reaction force increment ΔF in response to the corrected risk potential RPc by, for example, referring to the characteristic curve shown in FIG. 16. Then, the controller 150A calculates the sum of the reaction force increment ΔF and the ordinary reaction force characteristic to give an accelerator pedal reaction force instruction value FA.

At the next step S509, the controller 150A provides, as an output, the accelerator pedal reaction force instruction value FA to an accelerator pedal reaction force control unit 170.

The accelerator pedal reaction force control unit 170 controls a servo motor 180 in response to the accelerator pedal reaction force instruction value FA.

In addition to the effects provided by the sixth exemplary implementation, the seventh exemplary implementation provides an effect as follows:

The controller 150A corrects the relationship between the risk potential and reaction force, such as an accelerator pedal reaction force instruction value FA, based on the result of estimation of a driver's intention by the driver's intention estimating system 1 and the lane-changing intention estimating threshold value T. In other words, the risk potential RP is set to a lower value when the driver's intention estimating system 1 estimates a lane-changing intention, and to a higher value when the driver's intention estimating system 1 estimates otherwise. The risk potential RP is set to a lower value when the threshold value T is large, and to a higher value when the threshold value T is small. When the estimated driver's intention is a lane-changing intention, the driver's operation on the accelerator pedal 160 is not hampered by decreasing the accelerator pedal reaction force. If the threshold value T is large, the estimation accuracy is high, but estimation speed is slow. Referring to FIG. 20, when the threshold value T is large, the coefficient af multiplied to the time constant Tsf is set to a small value, allowing a quick damping of the accelerator pedal reaction force. As a result, a drop in error estimation of lane-changing intention and maintenance of risk potential dependent accelerator pedal reaction force regulation are accomplished.

In the previously described first to fifth exemplary implementations, the score Sc of the lane-changing likelihood is calculated using the equation Eq. 9, and a lane-changing intention is estimated when the score Sc is greater than the threshold value T. The present disclosure is not limited to this example. Another example is to calculate a score of the lane-keeping likelihood from the lane-changing likelihood Pr(LC) and the lane-keeping likelihood Pr(LK), and a lane-keeping intention is estimated after comparing this score to a threshold value.

In the sixth and seventh exemplary implementations, the risk potential RP is calculated using the time to collision TTC to the preceding vehicle and the time headway THW with regard to the preceding vehicle. The present disclosure is not limited to this example. Another example is the use of the reciprocal of TTC as a risk potential.

In the first to seventh exemplary implementations, the vehicle status detector is used as means detecting the status of the vehicle, the vehicle's environment detector 10 is used as means detecting the state of environment around the vehicle, and the real driver's operation detector 30 is used as means detecting operation by the real driver. The driver's intention approximate degree (degree of similarity) calculator 40 is used as means for calculating likelihood values for a plurality of intentions to operate the vehicle. The driver's intention estimator 60 is used as means for estimating a driver's intention of the driver based on the calculated likelihood values and a driver's intention estimating standard T. The variable threshold generator or the variable driver's intention estimating standard setting section 50 is used as means for altering the driver's intention estimating standard.

The laser radar 110, front camera 120 and vehicle speed sensor 140 constitute an obstacle detecting system or means. The risk potential calculator 151 is used as means for calculating risk potential RP. The accelerator pedal reaction force instruction value (FA) calculator (152 or 155) is used as means for calculating a reaction force instruction value FA. The accelerator pedal reaction force control unit 170 is used as means for regulating a reaction force associated with the accelerator pedal 160. The accelerator pedal reaction force instruction value correcting section 153 or the risk potential correcting section 154 are used as means for correcting the relationship between the risk potential and the reaction force. The present disclosure is not limited to the elements listed above. For example, a millimeter-wave radar of the other type may be used as means detecting the state of obstacle(s) within environment around the vehicle. The reaction force associated a steering device may be regulated as well as regulation of the reaction force associated with the accelerator pedal.

While the best modes for carrying out the disclosure have been described in detail, those familiar with the art to which the present disclosure relates will recognize various alternative designs and embodiments for practicing the disclosure as defined by the following claims.

What is claimed is:

1. A system for estimating an intention of a driver of a vehicle, comprising:
   a detector configured to detect a driving status of the vehicle, a state of environment around the vehicle, and an operation performed by the driver; and
   an intention estimation device configured to:
   calculate a likelihood value of each of a plurality of hypothetical intentions of the driver to operate the vehicle based on the detected operation performed by the driver the detected state of environment and the operation performed by the driver, and the detected driving status of the vehicle; and
   select one of the hypothetical intentions as an estimated intention of the driver based on calculated likelihood values of the plurality of hypothetical intentions and a criterion for estimating the driver's intention,
   wherein the intention estimation device includes an adjuster configured to adjust the criterion according to at least one of the detected state of environment and the detected driving status of the vehicle.

2. The system of claim 1, wherein the intention estimation device generates the estimated intention of the driver by performing the machine-implemented steps of:
   generating data related to a plurality of hypothetical intentions of the driver to operate the vehicle, wherein each of the plurality of hypothetical intention is associated with a hypothetical operation of the vehicle; and
   selecting one of the plurality of hypothetical intentions as the estimated intention of the driver, based on the detected operation performed by the driver, the hypothetical operation associated with each of the plurality of hypothetical intentions, and the criterion.

3. The system of claim 1, wherein the estimated intention is an intention to change lanes or an intention to keep in the same lane.

4. The system of claim 1, wherein the intention estimation device generates the estimated intention of the driver by performing the machine-implemented steps of:
   generating data related to a plurality of hypothetical intentions of the driver to operate the vehicle, wherein each of the plurality of hypothetical intentions is associated with a hypothetical operation of the vehicle;
   calculating a likelihood value associated with each of the plurality of hypothetical intentions of the driver, based on the detected operation by the driver and the hypothetical operation associated with each of the plurality of hypothetical intentions; and
   selecting one of the plurality of hypothetical intentions as the estimated intention of the driver, based on the respective likelihood value of each of the plurality of hypothetical intentions and the criterion.

5. The system of claim 4, wherein the criterion includes a comparison with a threshold selectively variable based on at least one of the state of environment and the operation status of the vehicle.

6. The system of claim 1, wherein the state of environment includes a curvature of a road in which the vehicle is traveling, and the criterion is variable with changes in the detected road curvature.

7. The system of claim 1, wherein the state of environment includes a driving status of a preceding vehicle in front of the vehicle, and the criterion is varied with changes in the operation status of the vehicle and the driving status of the preceding vehicle.

8. The system of claim 1, wherein the detector is configured to detect, as the driving status of the vehicle, at least one of a lateral speed of the vehicle, a lateral acceleration of the vehicle, and a yaw rate of the vehicle, and the criterion is varied with changes in at least one of the detected lateral speed, the detected lateral acceleration and the yaw rate.

9. The system of claim 1, wherein the state of environment includes a location of the vehicle within the lane in which the vehicle is traveling, and the criterion is varied with changes in the location of the vehicle within the lane in which the vehicle is traveling.

10. The system of claim 9, wherein the lane in which the vehicle is traveling is divided into a central region and two boundary regions, and the criterion is varied differently when the vehicle is in the central region and in one of the boundary regions.

11. The system of claim 1, further comprising:
a risk potential calculator configured to calculate a risk potential associated with the vehicle based on at least one of the operation status of the vehicle, the state of environment around the vehicle, and the operation performed by the vehicle; and
a control unit configured to transmit the calculated risk potential to the driver by regulating a reaction force applied to the driver via a driver-controlled input device of the vehicle based on the calculated risk potential and the estimated intention of the driver; wherein the driver-controlled input device is provided for the driver to operate the vehicle.

12. The system of claim 11, wherein the input device is an accelerator pedal.

13. The system of claim 1, wherein the intention estimation device is configured to:
a score of lane-changing intention according to the calculated likelihood values of the hypothetical intentions;
compare a preset threshold value and the calculated score of lane-changing intention;
estimate that the driver has an intention to change lanes when the calculated score of lane-changing intention exceeds the preset threshold; and
estimate that the driver has an intention to maintain in the same lane when the calculated score of lane-changing intention fails to exceed the preset threshold.

14. The system of claim 1, wherein:
the hypothetical intentions include an lane-keeping intention and a lane-changing intention; and
the intention estimation device is configured to:
calculate a difference between the likelihood value of the lane-keeping intention and the likelihood value of the lane-changing intention;
compare a preset threshold value and the calculated difference between the likelihood value of the lane-changing intention and the likelihood value of the lane-keeping intention;
estimate that the driver has an intention to change lanes when the likelihood value of the lane-changing intention and the likelihood value of the lane-keeping intention exceeds the preset threshold; and
estimate that the driver has an intention to maintain in the same lane when the likelihood value of the lane-changing intention and the likelihood value of the lane-keeping intention fails to exceed the preset threshold.

15. A vehicle comprising:
a detector configured to detect a driving status of the vehicle, a state of environment around the vehicle, and an operation performed by the driver of the vehicle; and
an intention estimation device configured to:
calculate a likelihood value of each of a plurality of hypothetical intentions of the driver to operate the vehicle based on the detected operation performed by the driver, the detected driving status of the vehicle, the detected state of environment around the vehicle; and
select one of the hypothetical intentions as an estimated intention of the driver based the calculated likelihood values of the plurality of hypothetical intentions and a criterion for estimating the driver's intention;
wherein the intention estimation device includes an adjuster configured to adjust the criterion according to at least one of the detected state of environment and the detected driving status of the vehicle.

16. A machine comprising:
detecting means for detecting an operation status of the machine, a state of environment around the machine, and an operation performed by the operator of the machine;
means for calculating a likelihood value of each of a plurality of hypothetical intentions of the operator to operate the machine based on the detected operation performed by the operator, the detected status of the machine and the detected state of environment around the machine;
means for selecting one of the hypothetical intentions as an estimated intention of the operator based on calculated likelihood values of the plurality of hypothetical intentions and a criterion for estimating the intention of the operator; and
means for varying the criterion according to at least one of the detected state of environment and the detected operation status of the machine.

17. A method for estimating an intention of an operator of a machine, comprising the machine-implemented steps of:
detecting an operation status of the machine, a state of environment around the machine, and an operation performed by the operator of the machine;
calculating a likelihood value of each of a plurality of hypothetical intentions of the operator to operate the machine based on the detected operation performed by the operator, the detected operation status of the machine, and the detected state of environment around the machine;
selecting one of the hypothetical intentions as an estimated intention of the operator based on the calculated likelihood values of the plurality of hypothetical intentions and a criterion for estimating the operator's intention; and
varying the criterion according to at least one of the detected state of environment and the detected operation status of the machine.

* * * * *